US012221115B1

(12) United States Patent
Blaes et al.

(10) Patent No.: US 12,221,115 B1
(45) Date of Patent: Feb. 11, 2025

(54) SELF-SUPERVISED GLOBAL VELOCITY DETERMINATION FOR PERCEPTION SYSTEM

(71) Applicant: Zoox, Inc., Foster City, CA (US)

(72) Inventors: Patrick Blaes, Redwood City, CA (US); Jifei Qian, Campbell, CA (US)

(73) Assignee: Zoox, Inc., Foster City, CA (US)

(*) Notice: Subject to any disclaimer, the term of this patent is extended or adjusted under 35 U.S.C. 154(b) by 350 days.

(21) Appl. No.: 17/733,802

(22) Filed: Apr. 29, 2022

(51) Int. Cl.
B60W 40/105 (2012.01)
B60W 60/00 (2020.01)
G06F 18/214 (2023.01)
G06N 20/00 (2019.01)

(52) U.S. Cl.
CPC ........ B60W 40/105 (2013.01); B60W 60/001 (2020.02); G06F 18/2148 (2023.01); G06N 20/00 (2019.01); B60W 2420/408 (2024.01)

(58) Field of Classification Search
CPC ............ B60W 40/105; B60W 60/001; B60W 2420/408; G06F 18/2148; G06N 20/00
USPC ......................................................... 701/70
See application file for complete search history.

(56) References Cited

U.S. PATENT DOCUMENTS

| 9,858,640 | B1 | 1/2018 | Earl et al. |
| 10,169,680 | B1 | 1/2019 | Sachdeva et al. |
| 10,330,787 | B2 | 6/2019 | Melvin et al. |
| 2017/0371348 | A1 | 12/2017 | Mou |
| 2018/0046649 | A1 | 2/2018 | Dal Mutto et al. |
| 2018/0107215 | A1 | 4/2018 | Djuric et al. |
| 2018/0349746 | A1 | 12/2018 | Vallespi-Gonzalez |
| 2021/0063560 | A1* | 3/2021 | Bosse ..................... G01S 13/60 |
| 2021/0096241 | A1 | 4/2021 | Bongio Karrman et al. |

(Continued)

FOREIGN PATENT DOCUMENTS

| CN | 109410321 A | 3/2019 |
| CN | 109466548 A | 3/2019 |
| CN | 109906608 A | 6/2019 |

(Continued)

OTHER PUBLICATIONS

Danzer, et. al., "2D Car Detection in Radar Data with PointNets", Cornell University Library, Apr. 17, 2019, 7 pages.

(Continued)

Primary Examiner — Yi-Kai Wang
(74) Attorney, Agent, or Firm — Lee & Hayes, P.C.

(57) ABSTRACT

Techniques for updating data operations in a perception system are discussed herein. A vehicle may use a perception system to capture data about an environment proximate to the vehicle. The perception system may output the data about the environment to a system configured to determine positions of objects relative to the perception system over time. The positions of the objects may be used to estimate an object velocity and may be compared against machine learning model outputs in a self-supervised manner to train the machine learning model to output object velocities based on inputs from the perception system. The output of the machine learning model may include a two-dimensional velocity for objects in the environment. The two-dimensional velocity may be used for a vehicle system such that the vehicle can make environmentally aware operational decisions, which may improve reaction time(s) and/or safety outcomes of the vehicle.

20 Claims, 11 Drawing Sheets

(56) References Cited

U.S. PATENT DOCUMENTS

2021/0364600 A1* 11/2021 Kang ..................... G01S 13/52

FOREIGN PATENT DOCUMENTS

| EP | 2090899 A2 | 8/2009 |
|---|---|---|
| JP | 2017156847 A | 9/2017 |

OTHER PUBLICATIONS

International Preliminary Report on Patentability for PCT Application No. PCT/US20/51777, mailed Apr. 14, 2022.
PCT Search Report and Written Opinion mailed Dec. 16, 2020 for PCT application No. PCT/US20/51777, 19 pages.
Office Action for U.S. Appl. No. 16/587,605, mailed May 3, 2022, Karrman, "Perception System", 12 pages.
Translated Office Action for Japanese Application No. 2022-519454, Dated Jul. 2, 2024, 14 pages.

* cited by examiner

SELF-SUPERVISED GLOBAL VELOCITY DETERMINATION FOR PERCEPTION SYSTEM

BACKGROUND

A navigation system for an autonomous vehicle often includes a conventional perception system, which can utilize a variety of data from sensors on board the autonomous vehicle. The conventional perception system can allow the autonomous vehicle to recognize objects in the physical environment so that the autonomous vehicle can plan a safe route through the environment. The safe operation of an autonomous vehicle depends at least in part on information made available by the conventional perception system in detecting, classifying, and predicting motion of objects. However, conventional perception systems may depend heavily on image data, which can require additional processing and ultimately delay decision making. This shortcoming may be significant in view of objects, such as vehicles, that change their trajectory in a relatively short span of time. Thus, improved processing speeds and reduced latency associated with perception systems that rely on different types of sensor data may improve the operational safety of autonomous vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
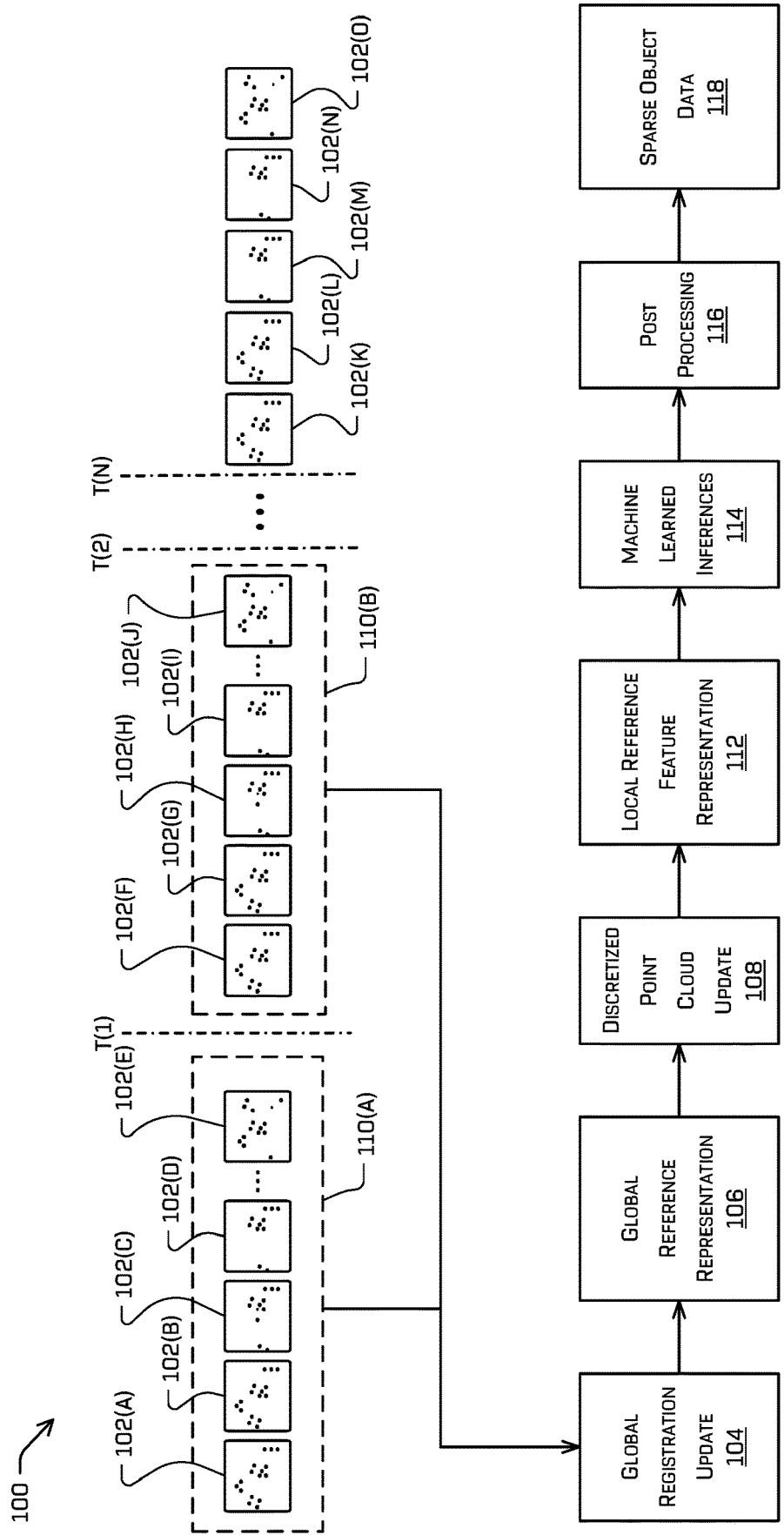
FIG. 1 is a process flow diagram illustrating an example data flow of a perception system, as described herein.

Techniques described herein are directed to a perception system which may include a radar-based perception system. In some examples, the radar-based perception system can be implemented in a system such as a vehicle or an autonomous vehicle. In general, autonomous systems, such as vehicles, often use a perception system processing various types of sensor data to identify objects and predict trajectories of those objects in order to safely navigate around the objects and, thereby, avoid collisions. The radar-based perception system, described herein, may be implemented using radar data in lieu of or in addition to other types of sensor data, such as image data and/or lidar data, in such a manner to reduce latency associated with sensor data used to make critical navigation decisions. For instance, using a radar-based perception system can reduce the perception system's reliance on environmental illumination as the radar sensors emit illumination, thereby improving the system's performance in unlighted or low-light environments. The use of radar-based perception systems can improve performance in perception in situations and environments where other perception systems may have decreased performance. Use of the radar-based perception system may also allow for improved performance in the case of degraded environments (e.g., foggy, rainy, snowy, etc.) due to the long wavelength of the radar when compared to other types of sensor systems. The radar-based perception system also produces improved accuracy with respect to determining the range rate or relative velocity of objects detected in the scene compared to other sensor technologies due to the radar being phase coherent.

In some examples, the perception system may perform updates on object state data, such as position, orientation, velocity, historical state, semantic information, etc., using a discretized point cloud representation of captured radar and machine learned algorithms (such as deep neural networks) outside of and in addition to more traditional perception pipelines. In some implementations, the radar-based perception system may utilize a top-down or two-dimensional machine learned radar perception update process. For instance, the radar-based perception system may receive radar-based point cloud data from one or more sensors positioned on the vehicle and convert the raw radar-based point cloud data into object level representations that may be processed or utilized by a planning and/or prediction system of the vehicle in making operational decisions for the vehicle. In some examples, the radar-based perception system may convert the radar-based point cloud data (which may represent at least three dimensions) into a point cloud representation (also referred to generally as a discretized data representation) usable for feature extraction and/or instance detection. The discretized data representation may represent three-dimensional data in a two-dimensional manner. In some examples, the three-dimensional data can be associated with a discretized region of an environment (e.g., a portion of a grid) whereby the three-dimensional data can be collapsed or otherwise represented in a two-dimensional manner. In some examples, such a two-dimensional representation may be referred to as a top-down representation. In some examples, a top-down or two-dimensional discretized data representations may store detections represented in the radar-based point cloud data as vectors, pillars, or collections. In some cases, a top-down representation may include a two-dimensional "image" of an environment, whereby each pixel of the image may represent a grid location (or other discretized region) that may have a fixed size, while in other cases, the grid locations or discretized regions may be associated with variable number of points. In the cases, where a variable size bin is used, the radar-based perception system may also limit or include a maximum bin size that may operate in the manner of a cyclic buffer.

In some implementations, such as when memory is a concern, the bins may represent multiple pixels to reduce the overall size of the grid. In another example, each bin may be configured to store a sparse point representation or sparse feature map of the radar-based point cloud data associated therewith. In some cases, the techniques may include applying a machine learned model (e.g., a trained deep neural network or convolutional neural network) to the point cloud representation to identify one or more objects and/or instances within the radar-based point cloud data that may be used by the planning and/or prediction systems. In some cases, the output of the deep neural network may be an object bounding box, an occupancy value, and/or state of the object (e.g., trajectory, acceleration, speed, size, current physical position, object classification, instance segmentation, etc.).

In some examples, a machine learning model (e.g., deep neural network or convolutional neural network) may be trained to output semantic information and/or state information by reviewing data logs to identify sensor data representing objects in an environment. In some cases, the objects can be identified, and attributes can be determined for the object (e.g., a pedestrian, a vehicle, a bicyclist, etc.) and the environment, and data representing the objects can be identified as training data. The training data can be input to a machine learning model where a known result (e.g., a ground truth, such as a known bounding box, velocity information, pose information, classification, etc.) can be used to adjust weights and/or parameters of the machine learning model to minimize a loss or error. In some examples training may be performed in a supervised manner (e.g., where ground truth is determined based at least in part on human annotations or from other perception models), an unsupervised manner (e.g., where a training data set does not include annotations), a self-supervised manner (e.g., where ground truth is determined based at least in part from prior generated models), and/or a semi-supervised manner using a combination of techniques.

In some examples, the perception system may utilize one or more global registration updates (e.g., association of the newly acquired radar data in a global reference frame and stored) followed by a discretized point cloud update. The global registration update may be configured to perform a registration on the radar-based point cloud stream that both projects and registers the radar-based point cloud stream using a global reference frame. For example, the global registration update may process for each interval of radar data received from the sensors. Thus, the global registration update may be performed multiple times for each iteration of the discretized point cloud update. In the global reference framed representation, the radar data of the radar-based point cloud stream may be sparsely stored in a cyclic buffer.

The discretized point cloud update may in some cases be dynamically initiated based on a trigger or criteria being met or exceeded. For example, the discretized point cloud update may commence based on a time period elapsing, a predetermined number of global registration updates completing, a predetermined number of points being registered using the global reference frame, among others. Upon initiation, the discretized point cloud update may utilize the registered points (e.g., the points within the global reference framed representation) to generate the point cloud representation. In some cases, the point cloud representation may be a two-dimensional or top down grid including a plurality of discretized regions or grid locations. In some examples, the discretized point cloud update may convert the global reference framed representation stored in the cyclic buffer into a point cloud representation having a local reference. As an illustrative example, the perception system may utilize platform state information and/or data associated with the point in the global reference frame representation to re-project the points positioned to reflect a local reference frame (such as the position, velocity, direction, etc. of the vehicle) and assign each point to a discretized region or grid location associated with the points position within the local reference frame. For example, the system may perform a positional transform (such as position subjection based on a position of the vehicle relative to the global reference frame) and a rotation (based on the yaw of the vehicle relative to the global reference frame) on the individual points to convert the points to the local reference frame.

The discretized point cloud update may apply a multi-layer perceptron and/or a point-wise pooling operation applied to each of the points within the local reference point cloud. In some examples, the multi-layer perceptron process may extract a feature vector per point. For example, the multi-layer perceptron may be trained with Stochastic Gradient Descent, for example, as part of the entire architecture in an end-to-end process that is based on multiple loss functions including a classification loss and a bounding box regression loss. In some cases, the multi-layer perceptron may include one or more deep network.

Thus, if a discretized region or bin is associated with or stores ten points, the multi-layer perceptron process may generate ten feature vectors associated with that discretized region or bin. The result is a grid in which each bin has a different number or variable number of features or vectors.

In some cases, the pooling operations may include a statistical summary over the feature vectors of each bin. For instance, the pooling operation may be a max pooling operation in which a maximum value associated with a feature of the feature vectors associated with a bin is selected to represent the bin. In some cases, the pooling operation may be performed per feature value when each feature vector includes multiple values. It should be understood that in other implementations, various types of pooling operations may be used, such as average pooling, minimum pooling, etc. In some cases, the pooling operation maybe selected to result in permutation invariance within the feature vectors.

A machine learned model, such as a neural network, may extract features from the local reference feature representation and map the features to semantic representation. For example, a machine learned model may comprise a network that maps objects from pixel to pixel within the grid. In one specific instance, a u-net architecture may be implemented. A u-net architecture is a convolutional neural network that can be used for image segmentation based on detecting valid parts of each convolution without relying on any fully connected layers. It should be understood that, other types of neural networks may be used, such as dilated convolutions. In some examples, features used during learning may include range rate, age of associated radar data, and position, while learned outputs include direction to object centers or semantic class information. In some examples, the features may include an offset time representative of the latency associated with the system to assist in predicting object data (e.g., position, velocity, direction of travel) at the time operational decisions are being made by the vehicle. In some instances, the offset time may be between approximately one millisecond and approximately ten milliseconds.

The feature vectors of the semantic state-based representation may be converted to object data (such as via a sparse state representation) that may be used to track objects through a scene and/or output to a planning and/or prediction system. For instance, the perception system may apply a per pixel class estimation to each of the bins to identify a class of the object as well as instance segmentation to determine a center of an object (e.g., a physical position) and/or if two pixels or bins are associated with the same object.

The perception system may also, in some implementations, perform post processing on the dense grid to generate a sparse object representation that may be used in object tracking. In some examples, the perception system may apply a non-maximum suppression technique to convert the grid into a sparse object representation.

In some examples, a machine learning model (e.g., deep neural network or convolutional neural network) may be trained to output velocity data for objects in response to radar data input to the machine learning model. The velocity data may be a two-dimensional velocity that is determined using a global frame of reference (e.g., a standard coordinate system) rather than a reference at the vehicle itself. For instance, the radar data may include radially oriented data (data aligned with a polar coordinate system with the vehicle at the origin) with locations and doppler velocity expressed in terms of the radial coordinate system. In such examples, the doppler velocity represents a radial velocity. Some radar sensors may provide a doppler measurement indicating a relative velocity of an object to a velocity of the radar sensor (e.g., the vehicle). Such doppler velocity measurements only provide a velocity of the object relative to the radar sensor and are one-dimensional (in the radial direction) and do not specify a yaw rate of the object, which may be necessary for safe operation in some environments. In some examples, a deterministic method may be used to determine the velocity of the objects (two-dimensional velocity) based on a global reference frame rather than relative to the radar sensor, for example as described with respect to U.S. patent application Ser. No. 16/795,411, the entirety of which is incorporated herein by reference for all purposes. The techniques described herein provide for training a machine learning model to produce two-dimensional velocity data for objects operating in an environment using radar input data (including doppler velocity information). Due to the doppler velocity and radar data as a whole being dependent on the relative position and motion of the radar sensor (e.g., an autonomous vehicle), it may be difficult to translate doppler velocity into an accurate global two-dimensional velocity for objects in an environment. Though described herein with respect to radar data, the techniques described herein may enable training and use of a machine learning model to estimate a two-dimensional velocity for one or more objects in an environment around an autonomous vehicle.

In some example examples, the radar data may include position information indicative of a location of objects in the environment, e.g., a range and azimuth relative to the vehicle and/or a radar source in a local or global coordinate system. The radar data may also include signal strength information. For example, the signal strength information may be an indication of a type or composition of the surface from which the radio waves are reflected. In some instances, the signal strength may be a radar cross-section (RCS) measurement. The radar data may also include velocity information, such as a range rate determined from a Doppler measurement. For instance, velocity of the object may be based on a frequency of radio energy reflected by the object and/or a time at which the reflected radio energy is detected. The radar data may additionally or alternatively also include specific information about the sensor, including but not limited to an orientation of the sensor, e.g., a pose of the sensor relative to the vehicle, a pulse repetition frequency (PRF) or a pulse repetition interval (PRI) for the sensor, a field of view or detecting arc, and/or the like.

In training the machine learning model to output the two-dimensional velocity for the objects in the environment, training data must be labeled for the model to accurately output two-dimensional velocity. Velocity information may be difficult and time consuming to label, as such information is difficult to determine and also time-intensive to label accurately. Accordingly, generating a training data set that may be used to train the model is a difficult task that may be fraught with errors due to human-labeling of instantaneous velocity information on radar data (an intrinsically difficult task) and is also time-consuming. In aspects of this disclosure, the training data can be input to a machine learning model where a known result (e.g., a ground truth, such as two-dimensional velocity information, pose information, classification, etc.) can be used to adjust weights and/or parameters of the machine learning model to minimize a loss or error. In some examples training may be performed in a supervised manner (e.g., where ground truth is determined based at least in part on human annotations or from other perception models), an unsupervised manner (e.g., where a training data set does not include annotations), a self-supervised manner (e.g., where ground truth is determined based at least in part from prior generated models), and/or a semi-supervised manner using a combination of techniques.

In some examples, the ground truth for the training of the machine learning model may be generated using multiple different radar scans at different points in time to create a velocity flow field and thereby learn velocity signals to generate two-dimensional velocity using the radar data, including the doppler velocity. In this self-supervised manner, radar data labeled with object positions may be input into a model. The radar data may be labeled by human annotation, as positions may be easily and rapidly annotated by human annotations. In some examples, the radar data may be labeled by an algorithm or machine learning model that identifies object locations within the radar data. Initially, the model may output velocity determinations for objects based on input radar data. The model may be self-supervised and ground truth may be determined based on estimated velocity for the objects based on successive radar data captures. The radar data is captured over a period of time, with at least a first time and a second time, separated by some time interval. By identifying changes in positions of the objects, the velocity during the time interval for the objects may be estimated. The ground truth data and the model output may be compared and the velocity loss minimized to train the model to output a two-dimensional velocity for the objects visible by the radar sensor.

The positions of the objects can be used to determine flow fields for the objects within the radar data. In some examples, rather than explicit object determination, the flow field may be performed on a pixel-by-pixel basis, such that each pixel is identified in the successive radar data snapshots with a velocity flow field established for all of the pixels of radar data. The flow field may be decoded by aggregating velocity data for particular clusters of pixels corresponding to bodies of objects to determine object velocities.

In some examples, the ground truth data may be supplemented and/or augmented by additional sensor data, such as other range sensors. In some examples, the ground truth data may be supplemented by vision data, such as camera or image data or other sources of data gathered by sensors of a vehicle system. In some examples, the ground truth data may be supplemented by other data, such as speedometer or telemetry data from the sensed vehicle to establish a ground truth instantaneous velocity for use in training models, for example. In this manner, the velocity estimation for the objects may be improved for the ground truth determination, which then leads to improvements in the training of the machine learning model. The additional sensor data may be used in conjunction with the successive radar scans to determine object positions and/or velocities. According to the techniques described herein, the training data may only be labeled with object identities, and thereby avoid the difficult task of velocity labeling for objects. In some examples, the object position labeling may be performed using one or more techniques described herein, such as point cloud identification. Additionally, in some examples, clusters of point clouds may be associated together to define a single rigid body for an object.

The doppler velocity of the radar data that is used by the model for the model output may be provided at varying frequencies (regarding the rate at which discrete doppler velocity readings are provided from a sensor) based on the sampling frequency of the radar sensor. In some examples, the velocity estimation based on object position between time-ordered radar data may be sampled at a similar frequency because the doppler velocity and object positions are sampled from the radar data being sampled at a single frequency. In some examples, different sensor modalities may provide data for use by the model at varying frequencies that may provide additional assurance and support for the output of the model, e.g., when using data sampled at other frequencies, the velocity output by the model may be improved through the use of additional data at additional frequencies and rates. In some examples, additional radar data from more than one radar sensor may be aggregated together to further refine and improve the velocity estimation for objects surrounding the vehicle. The additional radar data may be aggregated based on known distances and orientations between the radar sensors to combine the radar data from multiple sensors into a single frame of reference, such as on a coordinate frame based on the vehicle rather than the individual radar sensors. In this manner, the additional radar data may be used to provide additional data, additional frequencies, and/or further support for the radar data, including the doppler velocity, thereby increasing the inputs to the model to determine the global velocity of the objects. In some examples, vehicle to vehicle communication may provide radar data or other sensor data (such as other range sensor or speedometer data) from a vehicle operating in the environment around the subject vehicle to further improve the model output using the additional inputs to the model.

In some examples, objects may be identified using one or more additional models configured to detect rigid bodies within the radar data and identify one or more objects based on at least the radar data. In some examples, the object identification and position determination may be performed using additional sources of data such as other ranged sensors. The object identification may identify rigid bodies based on point cloud data, clusters of returns within radar data, or other such techniques.

The techniques discussed herein can improve a functioning of a computing device in a number of ways. In some examples, training a machine learning model is dependent on training data for such a model. Using the techniques described herein, a training dataset may be generated that has improved accuracy over typical approaches through the use of self-supervised training of the machine learning model. In particular, the labeling for the training data need only identify object locations, not object velocities, which can be time consuming and difficult to accurately label, but through the use of the self-supervised training scheme and data including successive radar scans of the environment, the model may be accurately trained to output velocity determinations for the objects in a global reference frame, despite the training data only including labels of positions for objects.

The techniques discussed herein can improve a functioning of a computing device in a number of additional ways. In some cases, utilizing a perception system, described herein, is configured to reduce the overall delay caused by preprocessing of sensor data, more accurately predict object velocity, and improve the accuracy of object detection in poorly lighted or degraded environment. In this manner, the system is able to provide an output to a prediction and/or planning system more representative of the real-life/real-time physical environment, thereby improving overall safety of the autonomous vehicle. It should be understood, that in some examples, the perception system may be used in combination with other perceptions systems that rely on image data, lidar data, as well as other types of sensor data.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In some examples, similar techniques may be utilized in driver-controlled vehicles in which such a system may provide an indication of whether it is safe to perform various maneuvers and/or a system to implement emergency maneuvers, such as emergency braking. In another example, the techniques can be utilized in an aviation or nautical context. Additionally, the techniques described herein can be used with real data (e.g., captured using sensor(s)), simulated data (e.g., generated by a simulator), or any combination of the two.

FIG. 1 is a process flow diagram illustrating an example flow 100 of a perception system, as described herein. In the illustrated example, radar data 102(A)-(O) representative of a physical environment may be captured by one or more sensors. In some cases, the radar data 102 may be captured based on a time interval associated with a speed of the sensor collecting the radar data 102. In these cases, each of the radar data 102(A)-(O) may represent the radar data 102 collected during one such time interval.

For each interval of radar data 102(A)-(O) captured by the one or more sensors, the perception system may perform a global registration update 104. The global registration update 104 may register the radar-based point cloud stream using the platform's state in the global reference frame to generate a global reference representation 106 of the radar data 102(A)-(O). For example, the global registration update 104 may project each point represented in the radar data 102(A)-(O) into a space having the global reference.

In some cases, the global registration update 104 may process multiple iterations prior to the system preforming or initiating the discretized point cloud update 108. For instance, in the illustrated example, the global registration update 104 may process once for each interval of radar data 102(A)-(E) prior to the commencement of the discretized point cloud update 108. Thus, as shown, the intervals of radar data 102(A)-(E), generally indicated by 110(A), may comprise data utilized by the global registration update 104 to generate a first instance of the global reference representation 106 that is used as an input to the discretized point cloud update 108. Similarly, the intervals of radar data 102(F)-(J), generally indicated by 110(B), may comprise data utilized by the global registration update 104 to generate a second instance of the global reference representation 106 that is used as a second input to the discretized point cloud update 108. In the current example, the discretized point cloud update 108 may be run based on a number of intervals of the radar data 102 being captured (e.g., every 5 intervals, 6 intervals, 10 intervals, etc.), however, it should be understood that various types of criteria or threshold may be utilized to trigger or initiate the discretized point cloud update 108.

The discretized point cloud update 108 may convert the global referenced representation of the radar data 102 to a point cloud representation having a local reference frame. For example, in some implementation, the discretized point cloud update 108 may perform a positional transform and a rotation (e.g., position subjection) on the individual points to convert the points from the global reference frame to the local reference frame.

The discretized point cloud update 108 may also apply multi-layer perceptron to each of point within the global reference representation 106. In some examples, the multi-layer perceptron process may extract a feature vector per point to generate a two-dimensional grid in which discretized region or grid location has a variable number of features or vectors. In some specific examples, the two-dimensional top down grid may be in the form of a 256 by 256 grid, 512 by 512 grid, or a 512 by 256 grid. In other examples, the dimensions of the grid may be variable or based on the size of a memory buffer associated with storing the point cloud representation. In still other examples, the grid may be based on the type of vehicle, the policy of the vehicle (e.g., the grid is extended in the direction of travel), based on the range of the radar sensors, among others. In some examples, each discretized region or grid location may represent in the range of ⅛ of a meter to ¼ of a meter in the physical environment, resulting in a grid covering an area of approximately 32 meters to approximately 128 meters depending on the size of the grid. However, it should be understood, that various physical sizes may be assigned to the discretized region or grid location, for instance, based on a size of the grid, size of the physical environment being covered, and variable memory. Thus, each point detected within the ⅛ of a meter represented by a discretized region or grid location is assigned to that discretized region or grid location.

The discretized point cloud update 108 may then apply one or more pooling operations to the two-dimensional grid. For instance, the discretized point cloud update 108 may include a statistical summary over the feature vectors of each discretized region to generate a local referenced feature representation 112 of the radar data 102.

In some implementations, the perception system may determine machine learned inferences 114 from the local referenced feature representation 112. In some examples, the machine learned inferences 114 may include utilizing one or more neural networks to extract features from the local referenced feature representation 112 and map the features to semantic state-based representation. For example, the application of the neural networks may be a network that maps objects from pixel to pixel within the grid.

The perception system may also perform post processing 116 prior to outputting to a prediction and/or planning system. For example, the post processing 116 may include may converting feature vectors of the semantic state-based point cloud representation into sparse object data 118 (such as via a sparse state representation) that may be used to track objects through a scene and output to a planning and/or prediction system. In some examples, the post processing 116 may include a per pixel class estimation to each of the discretized regions or bins to identify a class of the object as well as instance segmentation to determine a center of an object (e.g., a physical position) and/or if two pixels or bins are associated with the same object.

Figure 2:
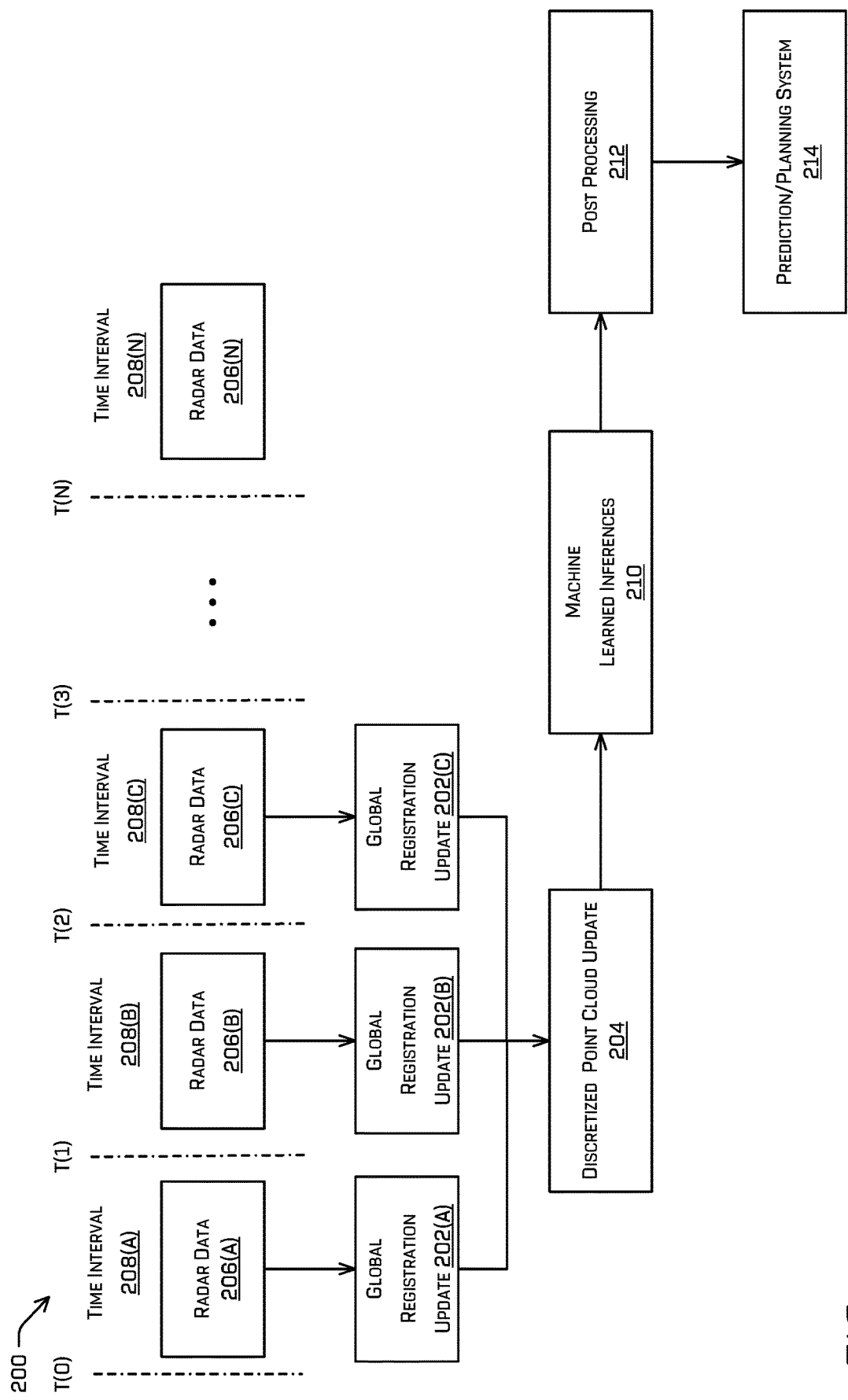
FIG. 2 is a timing diagram illustrating an example data flow of the perception system, as described herein.

FIG. 2 is a timing diagram illustrating an example data flow 200 of the perception system, as described herein. Similar, to the example flow 100 of FIG. 1, in the current example, the perception system may perform multiple global registration update, illustrated as global registration update 202(A)-(C), per discretized point cloud update 204. For instance, as illustrated, one or more sensors may capture radar data, such as radar data 206(A)-(C), during an associated time interval 208(A)-(C). For each interval of radar data 206(A)-(C) captured, the system may perform the corresponding global registration update 202(A)-(C). During each of the corresponding global registration update 202(A)-(C), the system may update or incorporate the radar data 206(A)-(C) into a shared global referenced representation.

As discussed above, the discretized point cloud update 204 may convert the global referenced representation to a point cloud representation having a local reference frame. For example, the discretized point cloud update 204 may perform a position subtraction (translation) and/or a rotation for each point based on the vehicles position relative to the global reference frame to convert the points from the global referenced representation to the local referenced representation.

Additionally, the discretized point cloud update 204 may apply multi-layer perceptron to extract at least one feature vector per point to generate a local referenced two-dimensional grid in which a discretized region or bin has a variable number of features or vectors. The discretized point cloud update 204 may then apply one or more pooling operations to the two-dimensional grid to generate a local referenced point cloud representation of the radar data 206(A)-(C) in which each discretized region or bin has a single feature vector representative of the points within the discretized region or bin. In some cases, the two-dimensional grid may be a series of point pillars, in which each point is a discretized region and each pillar is a feature vector. It should be understood that while the pooling operation may reduce the number of feature vectors within a discretized region or bin to one, that the size or length of the feature vector may vary from discretized region to discretized region (e.g., grid location to grid location) based at least in part on a number and/or type of features detected at each discretized region.

The perception system may determine machine learned inferences 210 from the local referenced point cloud representation. In some examples, the post processing 212 may include utilizing machine learning, such as one or more neural networks, to extract features from the local reference feature representation and map the features to two-dimensional semantic representation. For example, the application of the one or more neural networks may be a network that maps objects from pixel to pixel (or grid location to grid location) within the grid.

The perception system may also perform post processing 212 on a two-dimensional semantic representation to generate object and/or state data (which may be maintained in a sparse object state representation) prior to outputting to a prediction system 214. The prediction system 214 may then utilize the output of the perception system to make operational decisions for the autonomous vehicle.

Figure 3:
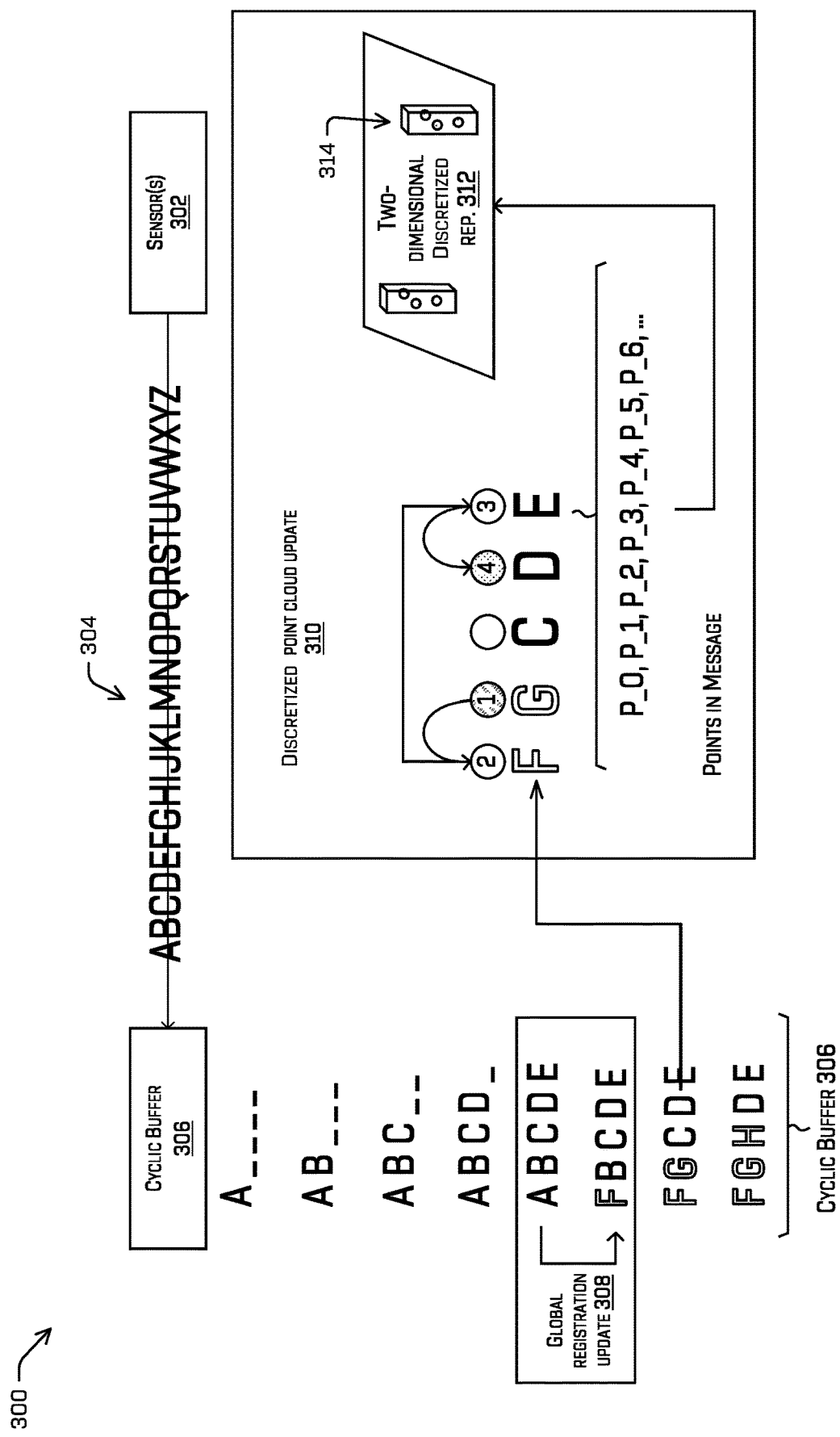
FIG. 3 is a pictorial diagram illustrating an example architecture of the perception system, as described herein.

FIG. 3 is a pictorial diagram illustrating an example architecture 300 of the radar-based perception system, as described herein. As discussed above, one or more sensors 302 may capture data 304 (such as radar data) from an environment surrounding a platform (such as an autonomous vehicle). The data 304 may then be provided as a stream of data to a cyclic buffer 306. In other examples, other buffer configuration may be used such as a ring type buffer or a first in first out buffer. In some cases, the cyclic buffer 306 may be a data structure that has a fixed-size buffer (in this particular example, a size of 5) that is connected end-to-end such that new data added to the cyclic buffer 306 replaces the oldest data. As illustrated, the data A, B, C, D, and E has already been added to the cyclic buffer 306 and the cyclic buffer 306 is receiving data F.

As part of the global registration update 308, the data F is registered to a global reference frame as data F is added to the cyclic buffer 306. In this example, since the cyclic buffer 306 is full (e.g., already holds 5 elements), the global registration update 308 may overwrite data A from the buffer (as data A is the oldest) with data F. In this manner, the perception system is able to maintain the a most recent set of the data 304 captured by the sensors 302 when performing the discretized point cloud update 310 to ensure that platform makes operational decisions based on the most recent or up-to-date set of the data 304. In the current example, the perception system also receives data G and performs a second global registration update 308 to register data G as well as to replace data B (the new oldest data) with data G.

In the illustrated example, the discretized point cloud update 310 may receive the contents from the cyclic buffer 306, as shown data FGCDE, as an input. In some cases, the discretized point cloud update 310 may be dynamically initiated based on one or more criteria being met or exceeded. In other cases, the discretized point cloud update 310 may be periodic or based on a state of the data stored in cyclic buffer 306. In some cases, the discretized point cloud update 310 may be configured to process a predetermined number of entries in the cyclic buffer 306. For instance, in this example, the discretized point cloud update 310 may be set to process four entries in the cyclic buffer 306 (e.g., one less than the size of the cyclic buffer 306).

In this example, the discretized point cloud update 310 may initiate from the newest or most recently added data to the cyclic buffer 306. Thus, the discretized point cloud update 310 may first add data G to the two-dimensional discretized representation 312 of the data 304. Following data G, the discretized point cloud update 310 may then add data F, E, and D to the two-dimensional discretized representation 312 of the data 304. As discussed above, the two-dimensional discretized representation may include discretized regions associated with multiple points of the data G, F, D, and E. Thus, as illustrated, a discretized region, such as location 314, may form a point pillar or collection of points. In some cases, as part of the discretized point cloud update 310 each point may have an associated feature vector having values associated with characteristics of the point. The two-dimensional discretized representation 312 of the data 304 may then be output for processing by a neural network or other learned inference technique, such as extracting semantic information and determining objects, prior to being provided to a planning or prediction system.

Figure 4:
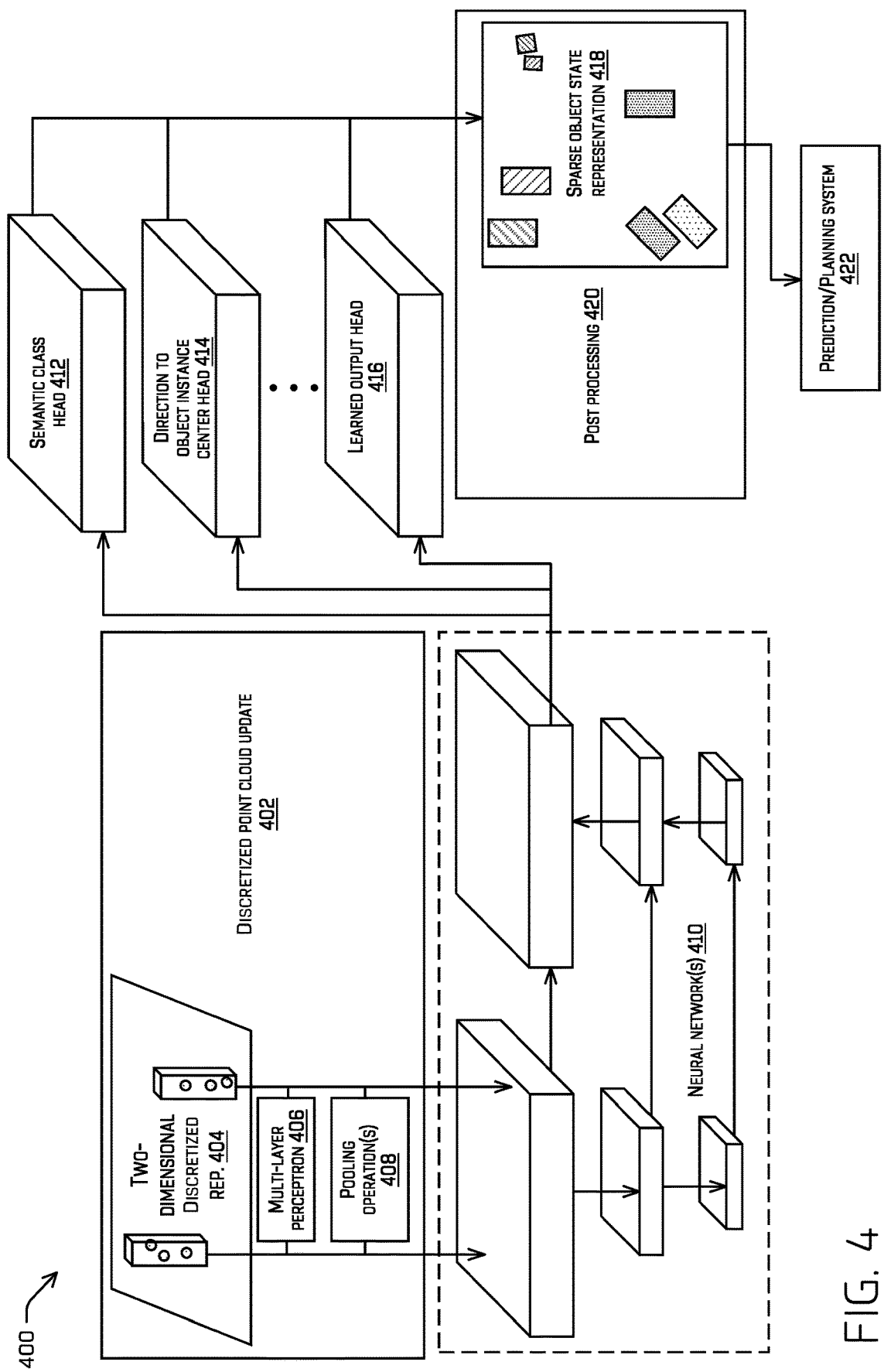
FIG. 4 is another pictorial diagram illustrating an example architecture of the perception system, as described herein.

FIG. 4 is another pictorial diagram illustrating an example architecture 400 of the radar-based perception system, as described herein. As discussed above, the system may perform a discretized point cloud update 402 to generate two-dimensional discretized representation 404. As part of the discretized point cloud update 402 and in addition to converting the points to a local reference frame (via one or more translations and/or rotations), the discretized point cloud update 402 may include applying multi-layer perceptron process 406 and/or one or more pooling operations 408 to the points associated with the two-dimensional discretized representation 404.

The multi-layer perceptron process 406 may extract a feature vector per point. Thus, if a discretized region (e.g., a grid location or region associated with a discretized representation of the environment) is associated with multiple points, the multi-layer perceptron process 406 may generate a feature vector for each of the points associated with that discretized region. The result is a grid in which each bin has a different number or variable number of features or vectors. The pooling operations 408 may apply a statistical summary over the feature vectors of each bin. For instance, the pooling operation 408 may apply a max pooling operation in which a maximum value associated with a feature of the feature vectors associated with a region is selected to represent the region, though any other pooling operation is contemplated (e.g., average, min, etc.). In this manner, each discretized region may be represented using a single feature vector. Alternatively, in other implementations, various other types of pooling operations may be used provided that the pooling operation selected introduces permutation invariance into the resulting feature vectors.

In the illustrated example, once the pooling operation 408 is complete, the perception system may utilize one or more neural networks 410 (such as via a U-Net architecture) to extract deep convolutional features from the feature vectors of the two-dimensional discretized point cloud representation 404.

For instance, the one or more neural networks 410 may generate any number of learned inference or heads, such as semantic class head 412, direction to object instance center head 414, as well as other learned output heads 416 (such as target extent, target azimuth, target velocity, object boundary box, etc.). In some cases, the neural network may be a trained network architecture that is end-to-end, with Stochastic Gradient Descent. For instance, object annotations in the global frame are registered to the local frame to provide supervised maps that may be used as ground truth targets for various network outputs or heads, such as heads 412-416. Specifically, appropriate truth outputs in the form of image maps may include semantic per-pixel classification (bike, pedestrian, vehicle), instance segmentation via regression to vectors that point toward object centers, and bounding box representations (yaw and extent information). The loss functions used may take advantage of homoscedasticity and/or heteroscedasticity: typical loss functions include mean square and mean absolute error as well as categorical cross entropy (including focal loss penalties that more disproportionately penalize rare cases to compensate for unbalanced data).

In the illustrated example, the semantic class estimation 412 may include segmenting and/or classifying the extracted deep convolutional features into semantic data (e.g., velocity, class or type, direction of travel, etc.). The process to determine the direction to object instance center head 414 may be configured to predict a vector from the point to the center of the target. For instance, this feature may be learned via a supervised method that trains a deep network to regress to vectors (an x and y value, per-pixel) that point to the center of a true object's bounding box representation when the pixel is within the bounds of the object's box. Further as part of the learned inferences, the system may perform segmentation using the per discretized region vector field to disambiguate which pixels or points belong to which object and convert the pixels or points to a sparse object representation.

A sparse object state representation 418 of the physical environment may result from the various heads, including the heads 412-416. Post processing 420 may then be performed on the sparse object state representation 418 to generate object data that may then be output to a prediction/planning system 422 for use in making operational decisions for the platform or autonomous vehicle. For example, the post processing 420 may include nonmaximal suppression, thresholding, Hough voting, connected components, and/or morphological operations, among others.

Figure 5:
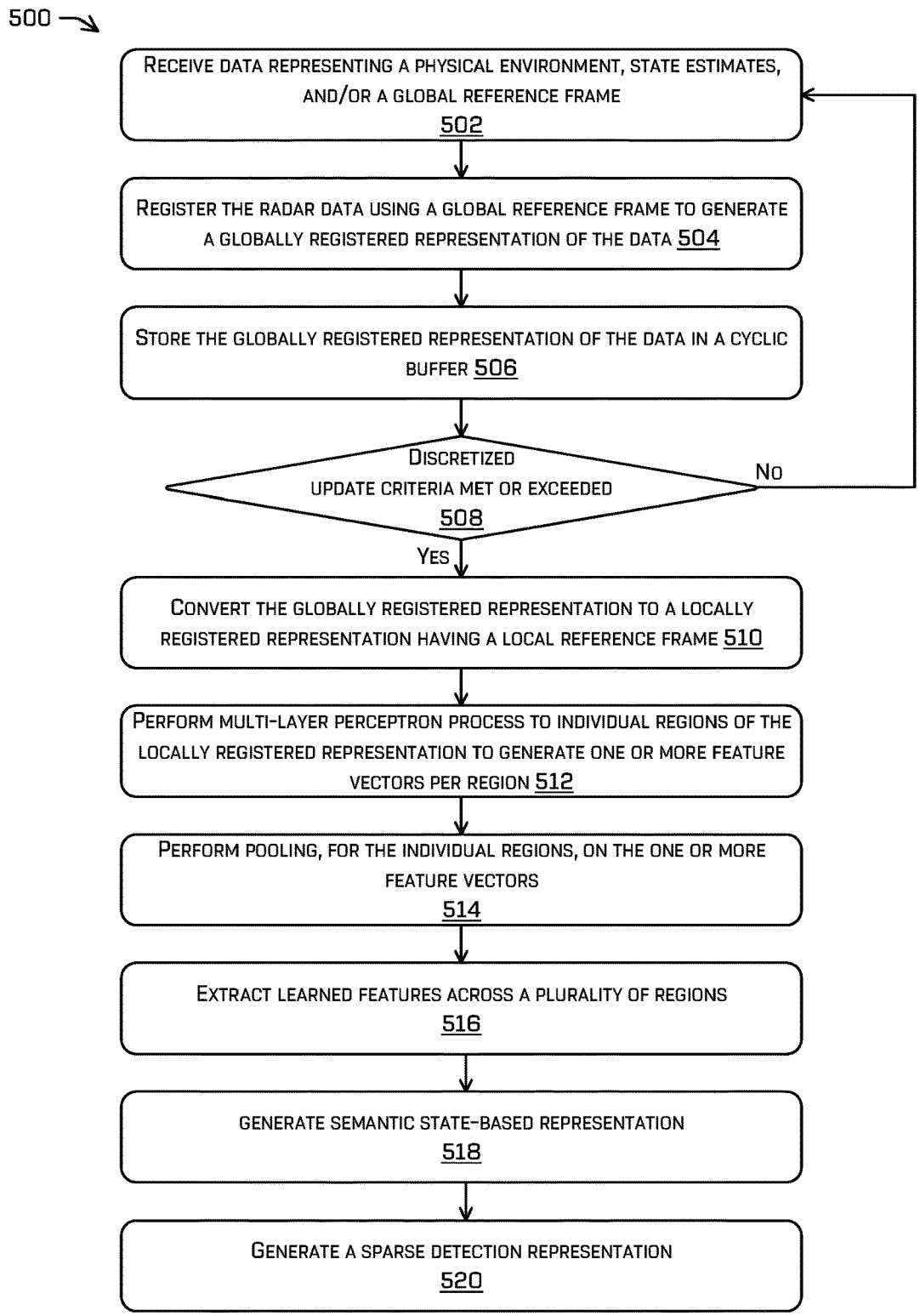
FIG. 5 is a flow diagram illustrating an example process of a perception system for generating object perception tracks, as described herein.

FIG. 5 is a flow diagram illustrating an example process 500 of the radar-based perception system for generating object perception tracks, as described herein. The process is illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

At 502, the radar-based perception system receives radar data representing a physical environment, platform state estimates, and/or a global reference frame. The radar data may be captured by one or more sensors physically located at one or more position of an autonomous vehicle. The radar data may be captured over a time interval. In some cases, the time interval may be based on one or more characteristic of the one or more sensors. In some cases, the platform state estimates may include vehicle state data and/or environmental object state data, such as position, orientation, velocity, historical state, semantic information, etc.

At 504, the radar-based perception system registers the data (e.g., radar data) using a global referenced frame to generate a globally registered representation of the radar data. For example, each point or detection within the radar data may be mapped or translated into a space having a global reference frame. In some cases, the global reference frame may be determined or received as part of the prior state estimates in 502.

At 506, the radar-based perception system may store the globally registered representation of the radar data in a cyclic buffer. For example, the globally registered representation may be stored as a sparse points collection having the global reference frame in the buffer. In some cases, the cyclic buffer may be a data structure that has a fixed-size buffer that is connected end-to-end such that new data added to the buffer replaces the oldest data.

At 508, the radar-based perception system may determine if discretized update criteria has been met or exceeded. If the criteria is met or exceed, the process 500 proceeds to 510, otherwise the process 500 returns to 502 and additional radar data is received and added to the cyclic buffer. In some cases, the criteria may be a time period elapsing, a predetermined amount of data stored in the cyclic buffer, a number of agents within the scene, the vehicle exceeding a predetermined velocity, a change in the vehicles direction of travel, etc.

At 510, the radar-based perception system may convert the globally registered representation to a locally registered representation having a local reference frame. For example, the system may utilize the most recent state estimate received as part of 502, any available metadata, a prior state of the scene, any known velocity, etc. to determine a physical location with respect to the global reference and perform one or more translations and/or rotations on the position of individual points to locate each point within the global reference frame.

At 512, the radar-based perception system may input the local reference into a multi-layer perceptron process (or classification operations) to individual regions of the locally registered representation to generate one or more feature vectors per region.

At 514, the radar-based perception system may perform pooling, for the individual regions, on the one or more feature vectors associated with the individual locally registered points. The pooling operations may include a statistical summary over the feature vectors of each bin. For instance, the pooling operation may be a max pooling operation in which a maximum value associated with a feature of the feature vectors associated with a bin is selected to represent the bin. In another example, the pooling operation may be an average pooling operation in which an average value associated with a feature of the feature vectors associated with a bin is selected to represent the bin. In some cases, the pooling operation may be performed per feature value when each feature vector includes multiple values.

At 516, the radar-based perception system performs extracts learned features across a plurality of regions. For example, the radar-based perception system may apply one or more neural networks or other types of machine learning techniques to extract features from the one or more portion of the point cloud representation of the radar data. In some cases, each portion of the point cloud representation may include one or more discretized region or grid location. In some examples, a u-net architecture may be implemented. A u-net architecture is a convolutional neural network that is utilized for image segmentation based on detecting valid parts of each convolution without relying on any fully connected layers. It should be understood that, in other example, other types of neural networks may be used.

At 518, the radar-based perception system generates a semantic state-based representation utilizing the extracted learned features. For instance, the radar-based perception system may apply a per pixel class estimation to each of the discretized regions to identify a class of the object as well as instance segmentation to determine a center of an object (e.g., a physical position) and/or if two discretized regions are associated with the same object. In some cases, a network may be applied to generate a neural network head for each desired state value. For instance, a network may determine a class of the object, a location or direction of a center of the object, a velocity, direction of travel, etc.

At 520, the radar-based perception system may generate a sparse detection representation based at least in part on the semantic state-based discretized representation. For example, the semantic state-based point cloud representation (e.g., the grid of features) may be converted to object data that may be used to track objects through a scene and/or output to a planning and/or prediction system. For example, the system may apply nonmaximal suppression, thresholding, Hough voting, connected components, and/or morphological operations, among others.

Figure 6:
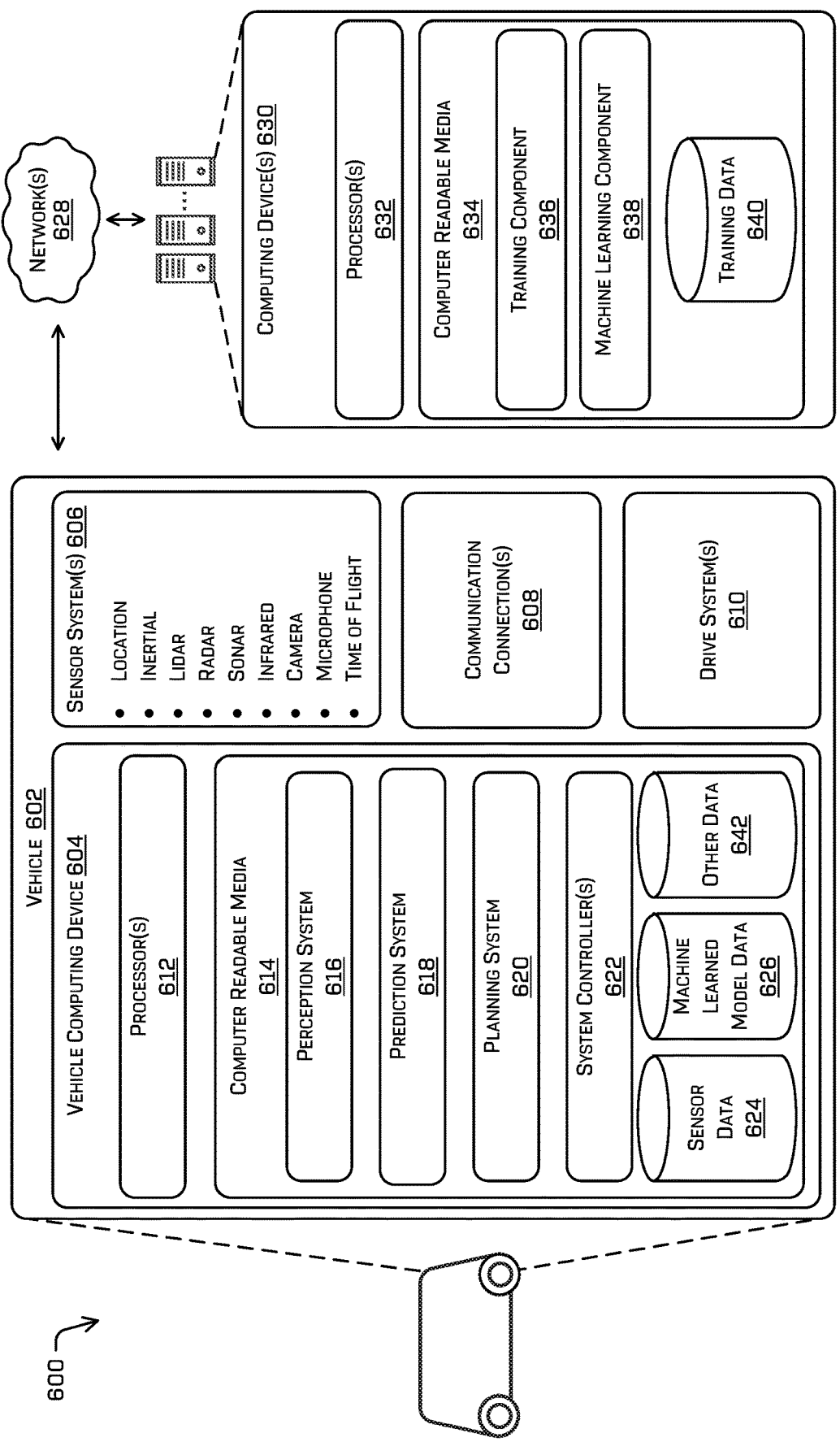
FIG. 6 is a block diagram of an example system for implementing the perception system, as described herein.

FIG. 6 is a block diagram of an example system 600 for implementing the techniques described herein, in accordance with embodiments of the disclosure. In some examples, the system 600 may include one or multiple features, components, and/or functionality of embodiments described herein with reference to FIGS. 1-5. In some embodiments, the system 600 may include a vehicle 602. The vehicle 602 may include a vehicle computing device 604, one or more sensor system(s) 606, one or more communication connection(s) 608, and one or more drive system(s) 610.

The vehicle computing device 604 may include one or more processor(s) 612 and computer readable media 614 communicatively coupled with the one or more processor(s) 612. In the illustrated example, the vehicle 602 is an autonomous vehicle; however, the vehicle 602 could be any other type of vehicle, or any other system (e.g., a robotic system, a camera enabled smartphone, etc.). In the illustrated example, the computer readable media 614 of the vehicle computing device 604 stores a perception system 616, a prediction system 618, a planning system 620, one or more system controllers 622 as well as sensor data 624 and other data 642. Though depicted in FIG. 6 as residing in computer readable media 614 for illustrative purposes, it is contemplated that the perception system 616, the prediction system 618, the planning system 620, the one or more system controllers 622 as well as the sensor data 624, machine learned model data 626, and the other data 642, may additionally, or alternatively, be accessible to the vehicle 602 (e.g., stored on, or otherwise accessible by, computer readable media remote from the vehicle 602).

In at least one example, the perception system 616 may be configured to receive sensor data 624 (e.g., radar data) captured during one or more-time interval intervals associated with the sensor system(s) 606. The radar-based perception system 616 may implement both a first update pipeline to generate a global referenced representation of the radar data and a second update pipeline to generate local referenced point cloud representation of the radar data based at least in part on the sensor data 624 and the machine learned model data 626. As discussed above with respect to FIGS. 1-5, the first update pipeline may process radar data collected during a plurality of time intervals and the second update pipeline may then process, for instance periodically or a response to a trigger being met or exceeded, the output of first update pipeline to generate one or more detected instances or object data that may be output to the prediction system 618 and/or the planning system 620.

In some cases, the detected instances or object data may include estimated current, and/or predicted future, characteristics or states of objects (e.g., vehicles, pedestrians, animals, etc.), such as pose, speed, trajectory, velocity, yaw, yaw rate, roll, roll rate, pitch, pitch rate, position, accelera-tion, or other characteristics, based at least in part on the sparse object state representation output by the perception system 616.

The planning system 620 may determine a path for the vehicle to follow to traverse through the physical environment. For example, the planning system 620 may determine various routes and trajectories and various levels of detail. For example, the planning system 620 may determine a route to travel from a current location to a target location. For the purpose of this discussion, a route may include a sequence of waypoints for travelling between two locations.

In at least one example, the vehicle computing device 604 can include one or more system controllers 622, which can be configured to control steering, propulsion, braking, safety, emitters, communication, and other systems of the vehicle 602. These system controllers 622 may communicate with and/or control corresponding systems of the drive system(s) 610 and/or other components of the vehicle 602.

In some instances, aspects of some or all of the components discussed herein can include any models, algorithms, and/or machine learning algorithms. For example, in some instances, components in the computer readable media 614 (and the computer readable media 634, discussed below) such as the perception system 616, the prediction system 618, and/or planning system 620, and may be implemented as one or more neural networks. For instance, the perception system 616 may comprise a machine learned model (e.g., neural network) which has been trained to predict speed, trajectory, and/or other characteristics of a pedestrian (or other object) based on the sensor data 624 and the machine learned model data 626.

In at least one example, the sensor system(s) 606 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), and one or more time of flight (ToF) sensors, etc. The sensor system(s) 606 can include multiple instances of each of these or other types of sensors. For instance, the lidar sensors may include individual lidar sensors located at the corners, front, back, sides, and/or top of the vehicle 602. As another example, the camera sensors can include multiple cameras disposed at various locations about the exterior and/or interior of the vehicle 602. The sensor system(s) 606 may provide input to the vehicle computing device 604. Additionally, or alternatively, the sensor system(s) 606 can send sensor data, via the one or more networks 628, to the one or more computing device(s) at a particular frequency, after a lapse of a predetermined period of time, in near real-time, etc.

The vehicle 602 can also include one or more communication connection(s) 608 that enable communication between the vehicle 602 and one or more other local or remote computing device(s). For instance, the communication connection(s) 608 may facilitate communication with other local computing device(s) on the vehicle 602 and/or the drive system(s) 610. Also, the communication connection(s) 608 may allow the vehicle 602 to communicate with other nearby computing device(s) (e.g., other nearby vehicles, traffic signals, etc.). The communications connection(s) 608 also enable the vehicle 602 to communicate with remote teleoperations computing device or other remote services.

The communications connection(s) 608 may include physical and/or logical interfaces for connecting the vehicle computing device 604 to another computing device (e.g., computing device(s) 630) and/or a network, such as network(s) 628. For example, the communications connection(s) 608 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive system(s) 610. In some examples, the vehicle 602 may have a single drive system 610. In at least one example, if the vehicle 602 has multiple drive system(s) 610, individual drive systems 610 can be positioned on opposite ends of the vehicle 602 (e.g., the front and the rear, etc.). In at least one example, the drive system(s) 610 can include one or more sensor system(s) 606 to detect conditions of the drive system(s) 610 and/or the surroundings of the vehicle 602, as discussed above. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 610. In some cases, the sensor system(s) 606 on the drive system(s) 610 can overlap or supplement corresponding systems of the vehicle 602.

In at least one example, the components discussed herein can process sensor data 624, as described above, and may send their respective outputs, over the one or more network(s) 628, to one or more computing device(s) 630. In at least one example, the components discussed herein may send their respective outputs to the one or more computing device(s) 630 at a particular frequency, after a lapse of a predetermined period of time, in near real-time, etc.

In some examples, the vehicle 602 can send sensor data to one or more computing device(s) 630 via the network(s) 628. In some examples, the vehicle 602 can send raw sensor data 624 to the computing device(s) 630. In other examples, the vehicle 602 can send processed sensor data 624 and/or representations of sensor data (for instance, the object perception tracks) to the computing device(s) 630. In some examples, the vehicle 602 can send sensor data 624 to the computing device(s) 630 at a particular frequency, after a lapse of a predetermined period of time, in near real-time, etc. In some cases, the vehicle 602 can send sensor data (raw or processed) to the computing device(s) 630 as one or more log files.

The computing device(s) 630 may include processor(s) 632 and computer readable media 634 storing a training component 636, a machine learning component 638, as well as training data 640. The training component 636 may generate the training data 640 using the sensor data 624 received from one or more vehicles 602. For instance, the training component 636 may label data representative of an object with one or more measured parameters or characteristics of the object in the sensor data 624. The training component 636 may then use the training data 640 to train the machine learning component 638 to predict motion states of predict current or future speed, trajectory, and/or any other characteristics of objects based on pose of the object depicted in sensor data 624.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 612 of the vehicle 602 and the processor(s) 632 of the computing device(s) 630 may be any suitable processor capable of executing instructions to process data and perform operations as described herein. By way of example and not limitation, the processor(s) 612 and 632 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

Computer readable media 614 and 634 are examples of non-transitory computer-readable media. The computer readable media 614 and 634 can store an operating system and one or more software applications, instructions, programs, and/or data to implement the methods described herein and the functions attributed to the various systems. In various implementations, the computer readable media can be implemented using any suitable computer readable media technology, such as static random-access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 6 is illustrated as a distributed system, in alternative examples, components of the vehicle 602 can be associated with the computing device(s) 630 and/or components of the computing device(s) 630 can be associated with the vehicle 602. That is, the vehicle 602 can perform one or more of the functions associated with the computing device(s) 630, and vice versa. Further, aspects of machine learning component 638 can be performed on any of the devices discussed herein.

Figure 7:
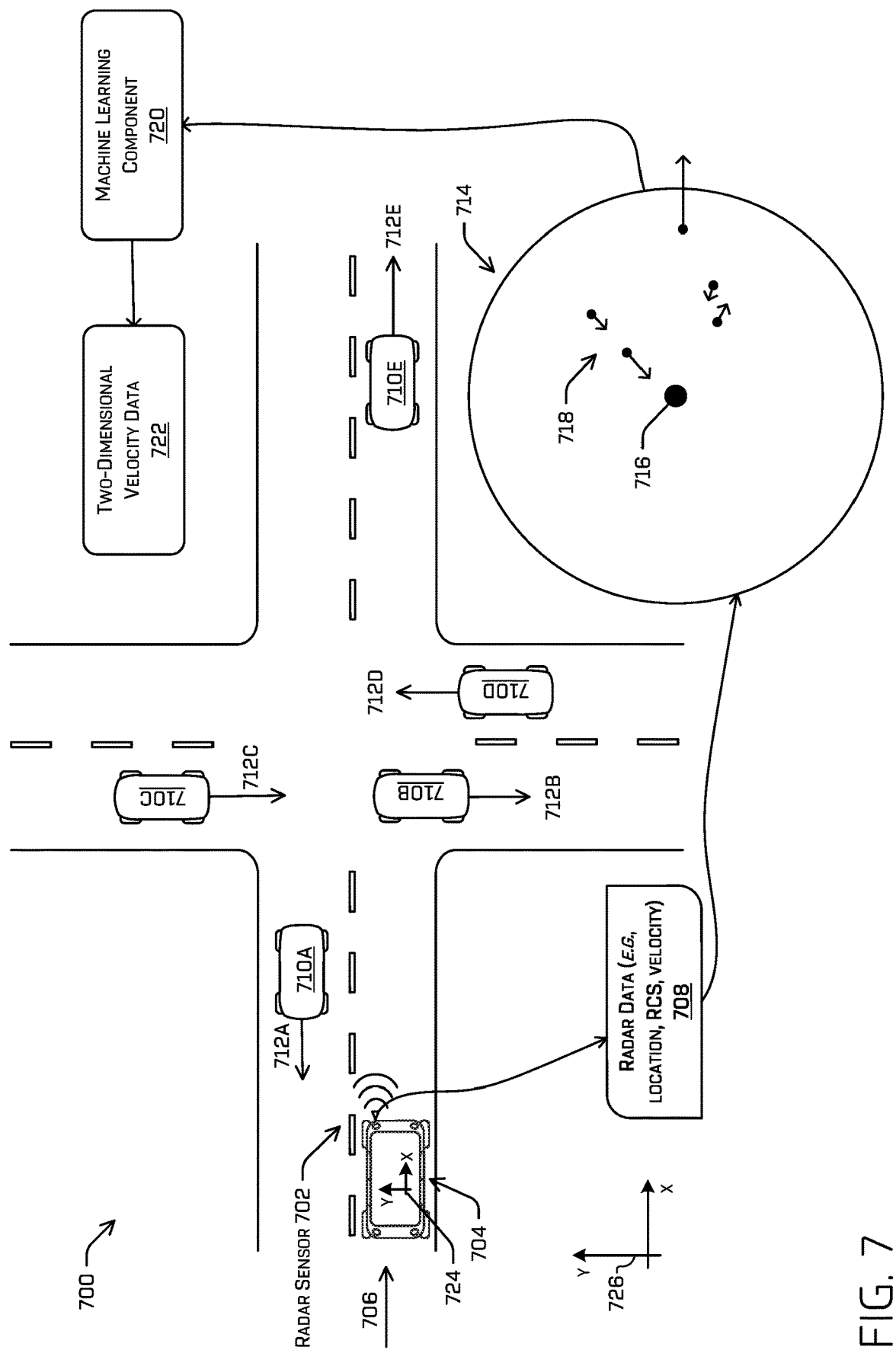
FIG. 7 is a pictorial diagram illustrating an example of a machine learning model used with the perception system, as described herein.

FIG. 7 is a pictorial diagram illustrating an example of a machine learning model used with the perception system, as described herein. In FIG. 7, an example scenario 700 is illustrated including a vehicle 704 equipped with a radar sensor 702. In some instances, the vehicle 704 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 704 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 704 is depicted as a land vehicle, vehicle 704 may be a spacecraft, watercraft, and/or the like. In some examples, vehicle 704 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 704 may receive sensor data from sensor(s) of the vehicle 704, including radar data 708 from the radar sensor 702. In some examples, the radar data 708 may be gathered from multiple radar sensors equipped on vehicle 704. In some examples, and although not shown in FIG. 7, the vehicle 704 may include additional sensors that provide other sensor data. The additional sensors may correspond to one or more of the sensor system(s) 606, discussed above. For example, the additional sensor(s) may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic, and/or sonar sensor, and/or other depth-sensing sensor), an image sensor (e.g., a camera), an audio sensor (e.g., a microphone), and/or environmental sensor (e.g., a barometer, a hygrometer, etc.).

The sensor may generate sensor data, which may be received by one or more computing devices associated with the vehicle 704. However, in other examples, some or all of the sensors and/or computing devices may be separate from and/or disposed remotely from the vehicle 704 and data capture, processing, commands, and/or controls may be communicated to/from the vehicle 704 by one or more remote computing devices via wired and/or wireless networks.

In the example scenario 700, the vehicle 704 is operating within an environment where other objects are also operating, positioned, and/or moving. The other objects may include stationary objects, moving objects, vehicles, obstacles, and other such objects that may be adjacent or on roadways where the vehicle 704 is operating. For example, in the example scenario 700, vehicles 710A-E are navigating on the roadways where the vehicle 704 is operating. Though described with respect to vehicles and moving objects, other objects may be present within the environment that are not shown.

The radar sensor 702 of the vehicle 704 detects the presence of the vehicles 710A-E. The radar data 708 may be received by the radar sensor 702. In the example scenario 700, the vehicle 704 may be traversing through the environment generally in a direction indicated by an arrow 706 (although in other implementations, the vehicle 704 may be stationary or moving in a different direction), such that the radar sensor 702 is disposed on the leading end of the vehicle 704, e.g., to capture data about objects in front of the vehicle 704. More specifically, the radar sensor 702 may capture the radar data 708, e.g., via one or more radar scans.

In some example implementations, the radar data 708 may include position information indicative of a location of objects in the environment, e.g., a range and azimuth relative to the vehicle 704 and/or a position in a local coordinate system 724 that is centered at the vehicle 704. The radar data 708 may also include signal strength information. For example, the signal strength information may be an indication of a type or composition of the surface from which the radio waves are reflected. In some instances, the signal strength may be a radar cross-section (RCS) measurement. The radar data 708 may also include velocity information, such as a range rate determined from a Doppler measurement. The velocity information included with the radar data 708 is gathered with respect to a radial velocity, that is, with respect to a one-dimensional velocity along a radial direction centered at the vehicle 704 and/or at the radar sensor of the vehicle. The doppler velocity only includes, therefore, part of the true velocity of the objects (e.g., because it only includes the radial component) but the accurate velocity of each object with respect to a global coordinate system 726 can be used for accurate planning and navigation through the environment. For instance, velocity of the object may be based on a frequency of radio energy reflected by the object and/or a time at which the reflected radio energy is detected. The radar data 708 may additionally or alternatively also include specific information about the sensor, including but not limited to an orientation of the sensor, e.g., a pose of the sensor relative to the vehicle, a pulse repetition frequency (PRF) or a pulse repetition interval (PRI) for the sensor, a field of view or detecting arc, and/or the like.

In determining the radar data 708, a computing device associated with the vehicle 704 may determine returns associated with an object based at least in part on the radar data 708, according to any of the techniques discussed herein. The illustration of FIG. 7 comprises a visualization 714 of radar data 718. More specifically, the visualization 714 includes a plurality of representations of radar points illustrated as circular points, which may be representative of returns caused by objects, surfaces, or other reflective items, in an environment of the vehicle 704. In the example, each of the points depicted as part of the visualization 714 may correspond to a position of a surface associated with one of the vehicle 710 that reflected a radio wave emitted by the radar device and was detected at the radar sensor 702. As will be appreciated, the radar sensor 702 may receive and/or generate several types of information about the environment, so the visualization 714 could include more or less information: the visualization 714 is merely for explanatory purposes. In some examples, the objects identified and shown in visualization 714 may also be identified using additional sensor and/or perception systems of the vehicle 704.

The visualization 714 illustrates that some of the points appear to be close in location, and as such, may be associated with a single object. In some examples, each of the points may be from individual elements, however, in some examples, clusters of points from reflections off surfaces may be related to a single rigid object. As described herein, radar reflections may be used to identify rigid bodies from clusters of reflection data. For example, points within a threshold distance may be estimated to be indicative of a single object. For example, a data association component, as discussed in more detail in U.S. patent application Ser. No. 16/416,686, the entirety of which is incorporated herein by reference for all purposes, may determine that a subset of points could be identified as a point cluster representative of an object in the environment surrounding the vehicle 704. In examples described herein, and as discussed above, a point cluster may include a plurality of points that have some likelihood, e.g., a level and/or degree of similarity, to identify a single object or grouping of objects that should be considered together, e.g., by a planning system of an autonomous vehicle. In aspects of this disclosure, information in addition to position information may be used to determine the point cluster. Moreover, the data association component may consider historical information, e.g., track information for the vehicle 704 and/or the object to properly associate the radar returns with the object.

In some examples, the radar data 708 (and/or the visualization 714) may include doppler velocity and radar data at varying frequencies and/or multiple radar sensors. The doppler velocity of the radar data that is used by the machine learning component 720 may be provided at varying frequencies based on the sampling frequency of the radar sensor or a combination of multiple radar sensors. In some examples, the two-dimensional velocity data 722 based on object position between time-ordered radar data may be sampled at a similar frequency because the doppler velocity and object positions are sampled from the radar data being sampled at a single frequency. In some examples, different sensor modalities may provide data for use by the model at varying frequencies that may provide additional assurance and support for the output of the model, e.g., when using data sampled at other frequencies, the velocity output by the model may be improved through the use of additional data at additional frequencies and rates. In some examples, additional radar data from more than one radar sensor may be aggregated together to further refine and improve the velocity estimation for objects surrounding the vehicle. The additional radar data may be aggregated based on known distances and orientations between the radar sensors to combine the radar data from multiple sensors into a single frame of reference, such as on a coordinate frame based on the vehicle rather than the individual radar sensors. In this manner, the additional radar data may be used to provide additional data, additional frequencies, and further support for the radar data, including the doppler velocity, thereby increasing the inputs to the model to determine the global velocity of the objects. In some examples, vehicle to vehicle communication may provide radar data or other sensor data (such as other range sensor or speedometer data) from a vehicle operating in the environment around the subject vehicle to further improve the model output using the additional inputs to the model.

Accordingly, in implementations of this disclosure, the computing device associated with the vehicle 704 may determine returns representative of the objects, e.g., because the points may be clustered based on one or more diverse types of information, and because sensor data from multiple scans and/or radar sensors is used to create the cluster. The center of the visualization 714 illustrates the location of the vehicle 704 relative to the other objects. The visualization 714 includes relative locations of the objects as well as other information, such as the doppler velocity associated with each object. As discussed herein, the doppler velocity is a one-dimensional measure of the relative velocity of each object along the radial coordinate system of the radar sensor 702 and therefore does not provide a complete picture of the velocity of each object, and also does not account for motion of the vehicle 704 as only relative velocity is reflected in the radar data 718. For example, even though vehicles 710B and 710C are traveling with velocities 712B and 712C, the radial components of their velocity relative to the vehicle 704 (represented by the dot 716) is relatively small. Therefore, without translating the radar data to determining two-dimensional velocities for each object, the environment may not be accurately reflected by a perception component of the vehicle 704.

The radar data 708 may be input into a machine learning component 720, discussed in further detail below, that is used to determine two-dimensional velocity data 722 for each of the objects in the environment surrounding the vehicle 704. The machine learning component 720 includes one or more machine learning models configured to receive inputs such as the radar data 708 as well as other perception data from sensors of the vehicle 704, and output two-dimensional velocity data for the objects with reference to a global coordinate system 726.

The machine learning component 720 may be trained to output two-dimensional (or three-dimensional) velocity data for objects in response to radar data input to the machine learning model. The velocity data may be a two-dimensional velocity or three-dimensional velocity that is determined using a global frame of reference (e.g., a standard coordinate system) rather than a reference at the vehicle itself. For instance, the radar data 708 is radially oriented data (data aligned with a polar coordinate system with the vehicle 704 at the origin) with locations and doppler velocity expressed in terms of the radial coordinate system (as illustrated in the visualization 714). In such examples, the doppler velocity represents a radial velocity.

In some examples, the radar data 708 includes position information indicative of a location of objects in the environment, e.g., a range and azimuth relative to the vehicle and/or a radar source in a local. The radar data may also include signal strength information. For example, the signal strength information may be an indication of a type or composition of the surface from which the radio waves are reflected. In some instances, the signal strength may be a radar cross-section (RCS) measurement. The radar data may also include velocity information, such as a range rate determined from a Doppler measurement. For instance, velocity of the object may be based on a frequency of radio energy reflected by the object and/or a time at which the reflected radio energy is detected. The radar data may additionally or alternatively also include specific information about the sensor, including but not limited to an orientation of the sensor, e.g., a pose of the sensor relative to the vehicle, a pulse repetition frequency (PRF) or a pulse repetition interval (PRI) for the sensor, a field of view or detecting arc, and/or the like.

In training the machine learning model to output the two-dimensional velocity for the objects in the environment, training data must be labeled for the model to accurately output two-dimensional velocity. Velocity information may be difficult and time consuming to label, as such information is difficult to determine and also time-intensive to label accurately. Accordingly, generating a training data set that may be used to train the model is a difficult task that may be fraught with errors due to human-labeling of velocity information on radar data (an intrinsically difficult task) and is also time-consuming. The training data can be input to a machine learning model where a known result (e.g., a ground truth, such as two-dimensional velocity information, pose information, classification, etc.) can be used to adjust weights and/or parameters of the machine learning model to minimize a loss or error. In some examples training may be performed in a supervised manner (e.g., where ground truth is determined based at least in part on human annotations or from other perception models), an unsupervised manner (e.g., where a training data set does not include annotations), a self-supervised manner (e.g., where ground truth is determined based at least in part from prior generated models), and/or a semi-supervised manner using a combination of techniques.

In some examples, the ground truth for the training of the machine learning model may be generated using multiple different radar scans at different points in time to create a velocity flow field and thereby learn velocity signals to generate two-dimensional velocity using the radar data, including the doppler velocity. In this self-supervised manner, radar data labeled with object positions may be input into a model. Initially, the model may output velocity determinations for objects based on input radar data. The model may be self-supervised and ground truth may be determined based on estimated velocity for the objects based on successive radar data captures. The radar data is captured over a period of time, with at least a first time and a second time, separated by some time interval. By identifying changes in positions of the objects, the velocity during the time interval for the objects may be estimated. The ground truth data and the model output may be compared and the velocity loss minimized to train the model to output a two-dimensional velocity for the objects visible by the radar sensor.

In some examples, the two-dimensional velocity of objects may be determined by generating a flow field (e.g., the velocity of an entire area or region on a pixel-by-pixel basis) and objects may be identified from the flow field by identifying clusters of points or flow field data that travel together, e.g., in the same direction and with the same velocity. The flow field may be decoded by aggregating velocity data for particular clusters of pixels corresponding to bodies of objects to determine object velocities.

Figure 8:
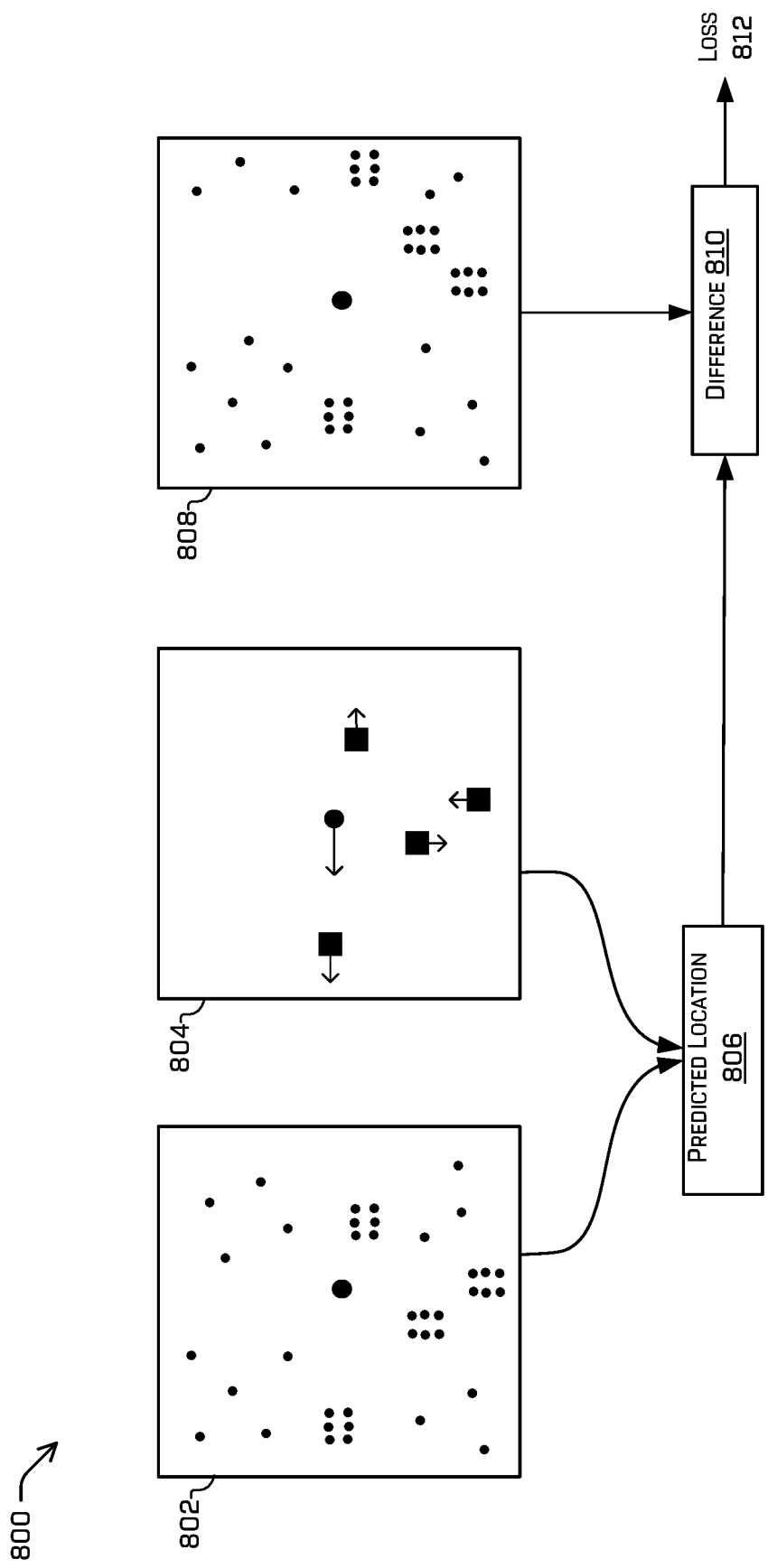
FIG. 8 is a pictorial diagram illustrating an example of a self-supervised machine learning model for use with the perception system to determine object velocities, as described herein.

FIG. 8 is a pictorial diagram illustrating an example of a self-supervised machine learning model for use with the perception system to determine object velocities, as described herein. The machine learning model is trained using a self-supervision technique 800 as illustrated in FIG. 8. The self-supervision enables the machine learning model to output velocity information in a global coordinate system after receiving position information with the radar data. In this manner, the training data for the machine learning model need not be labeled with velocity data, but only with positions. Object positions may be labeled in a much faster, accurate, and more efficient manner than velocity and also more reliably due to the nature of labeling. Velocity labeling requires identification of objects and empirical determination of velocity, while position labeling requires only identification of an object within the radar data. By using successive radar scans over known time intervals, velocities for objects may be estimated and used to train the model by minimizing velocity loss.

As illustrated in FIG. 8, a first probability map 802 illustrates probabilities of locations of objects at a first time. The first probability map 802 may be based on or include the radar data from the radar sensor. In the first probability map 802, clusters of points may be identified as related to one another to identify rigid bodies, as described herein. The second frame 804 illustrates a velocity output of the machine learning model based on the provided radar data. The velocity output from the machine learning model and the first predicted location from the first probability map 802 may be used to determine a predicted location 806. The predicted location is for a known time in the future of the first time. The predicted location 806 may then be compared against a second probability map 808, from a second time from a successive radar scan. The second time corresponds to the time at which the predicted location 806 is determined. Any differences 810 between the predicted location of the objects based on the model output and the locations at the first time and the actual locations from the second radar scan, may be used to compute a loss function 812. By minimizing the loss function 812 over successive trials of the machine learning model using labeled position data, the machine learning model may be trained in a self-supervised manner to output the velocity of the objects based on the input radar data.

In some examples, the model output at the second frame 804 may be determined using additional sensor data, such as additional range sensor data and/or image data. Such additional data may provide further positional and/or velocity information that may be used to refine the model and provide additional ground truth for the training of the model.

Figure 9:
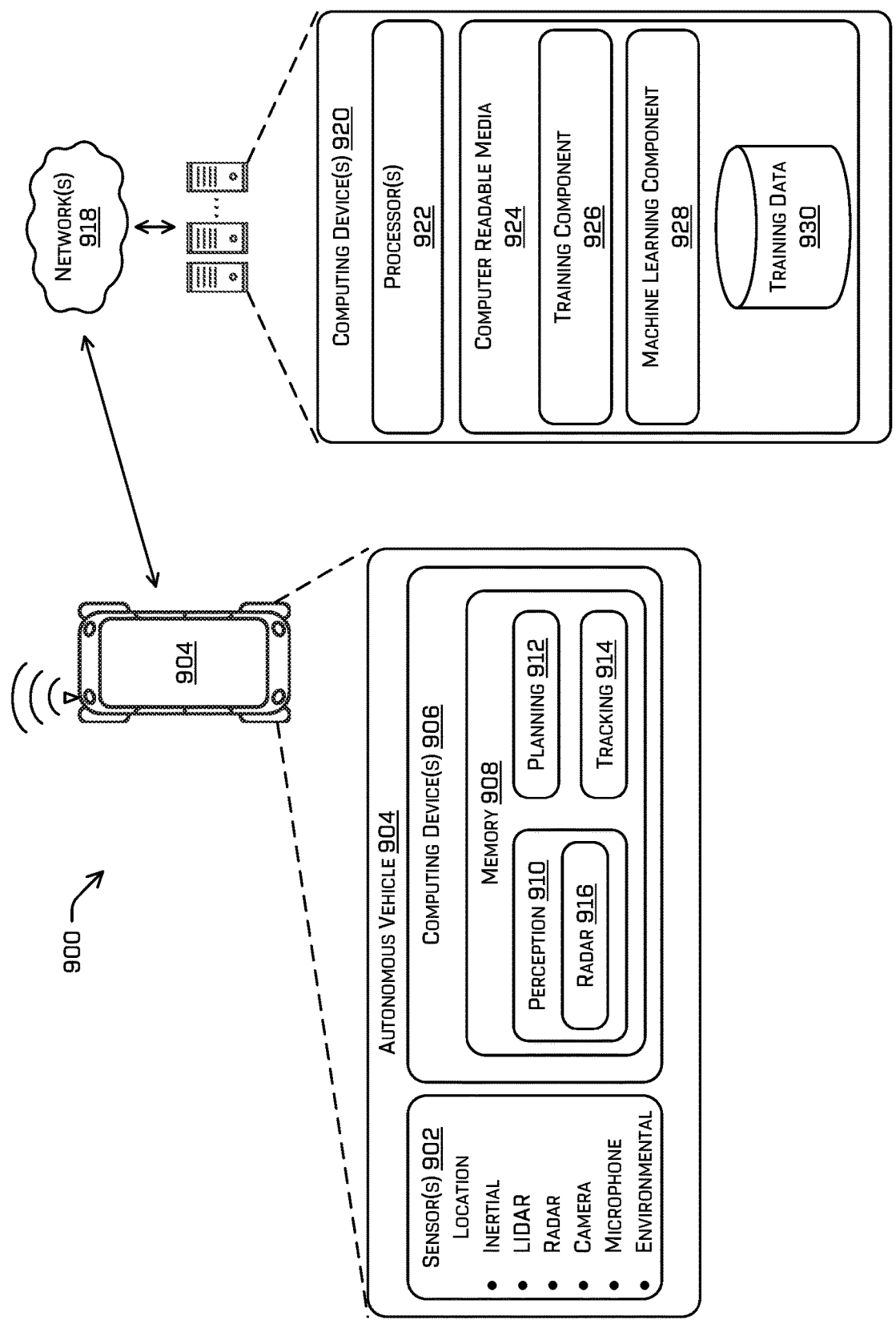
FIG. 9 is a pictorial diagram illustrating an example architecture of the machine learning model and training system, as described herein.

FIG. 9 is a pictorial diagram illustrating an example architecture 900 of the machine learning model and training system, as described herein. In some examples, the example architecture 900 may be implemented with the vehicle 602 and/or computing device(s) 630 of the example system 600 of FIG. 6. In FIG. 9, a vehicle 904 equipped with sensor(s) 902. In some instances, the vehicle 904 may be an autonomous vehicle as described herein. According to the techniques discussed herein, the vehicle 904 may receive sensor data from sensor(s) 902 of the vehicle 904. In some examples, the vehicle 904 may include additional sensors that provide other sensor data. For example, the sensor may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic, and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 902 may generate sensor data, which may be received by one or more computing device(s) 906 associated with the vehicle 904. However, in other examples, some or all of the sensors and/or computing devices may be separate from and/or disposed remotely from the vehicle 904 and data capture, processing, commands, and/or controls may be communicated to/from the vehicle 904 by one or more remote computing device(s) 920 via wired and/or wireless networks such as network 918.

The sensor(s) 902 may generate sensor data, which may be received by one or more computing devices associated with the vehicle 904. However, in other examples, some or all of the sensors and/or computing devices may be separate from and/or disposed remotely from the vehicle 904 and data capture, processing, commands, and/or controls may be communicated to/from the vehicle 904 by one or more remote computing devices via wired and/or wireless networks.

Computing device(s) 906 may comprise a memory 908 storing a perception component 910, a planning component 912, and/or tracking component 914. In some examples, the perception component 910 may comprise a radar component 916 configured to determine a velocity of an object based at least in part on radar data. The perception component 910, the planning component 912, the tracking component 914, and/or the radar component 916 may include one or more machine-learned (ML) models and/or other computer-executable instructions such as those described herein.

In general, the perception component 910 may determine what is in the environment surrounding the vehicle 904 and the planning component 912 may determine how to operate the vehicle 904 according to information received from the perception component 910. For example, the planning component 912 may determine trajectory based at least in part on the perception data and/or other information such as, for example, one or more maps, localization information (e.g., where the vehicle 904 is in the environment relative to a map and/or features detected by the perception component 910), and/or the like. The trajectory may comprise instructions for controller(s) of the vehicle 904 to actuate drive components of the vehicle 904 to effectuate a steering angle and/or steering rate, which may result in a vehicle position, vehicle velocity, and/or vehicle acceleration. For example, the trajectory may comprise a target heading, target steering angle, target steering rate, target position, target velocity, and/or target acceleration for the controller(s) to track. In some examples, the controller(s) may comprise software and/or hardware for actuating drive components of the vehicle 904 sufficient to track the trajectory. For example, the controller(s) may comprise one or more proportional-integral-derivative (PID) controllers.

In some examples, the perception component 910 may receive sensor data from the sensor(s) 902 and determine data related to objects in the vicinity of the vehicle 904 (e.g., object classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), etc.

In some examples, the perception component 910 may comprise a pipeline of hardware and/or software, which may include one or more GPU(s), ML model(s), Kalman filter(s), and/or the like. In some examples, the perception component 910 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise radar data, which the perception component 910 may receive as input. The perception component 910 may be configured to detect as many objects and information about the environment as possible to avoid failing to account for an event or object behavior that should be taken into account by the planning component 912 in determining the trajectory.

In some examples, one or more components of the perception component 910 may determine a subset of the radar data associated with an object, such as vehicle 704 in the example scenario 700. Regardless, the radar component 916 may receive at least a subset of radar data associated with an object and may determine a two (or more)-dimensional velocity associated with the object according to the techniques discussed herein. For example, the velocity may be a velocity having at least two components, such as a lateral component, a longitudinal component, and/or a yaw component relative to a global coordinate frame. The coordinate frame may be a coordinate system oriented based on the environment, a roadway or path, an inertial direction of movement associated with the vehicle 704, and/or the like. The depicted coordinate system 726 may be relative to a pose of the autonomous vehicle.

In some examples, the velocity determined by the techniques discussed herein may be provided to a prediction component of the perception component 910 and/or planning component 912. The prediction component may use the velocity to predict a future state of a detected object based at least in part on the velocity, such as a predicted trajectory (e.g., predicted heading, predicted velocity, predicted path). In an additional or alternate example, the velocity may be provided to the planning component 912 for the planning component 912 to determine a trajectory for controlling the vehicle 904. The planning component 912 may determine the trajectory based at least in part on the predicted trajectory and/or the velocity determined by the radar component 916.

In some examples, the radar component 916 may additionally or alternately estimate a center of the detected object and/or a dimensions and/or size of the detected object based at least in part on a subset of radar data associated with the object.

The object classifications determined by the perception component 910 may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. The data produced by the perception component 910 may be collectively referred to as perception data, which may comprise the two-dimensional velocity determined according to the techniques discussed herein. Once the perception component 910 has generated perception data, the perception component 910 may provide the perception data to the planning component 912. In some examples, perception data may comprise outputs of sensor specific pipelines (e.g., vision, lidar, radar) and/or hybrid sensor pipelines (e.g. vision-lidar, radar-lidar).

In some examples, the vehicle 904 can send sensor data to one or more computing device(s) 920 via the network 918. In some examples, the vehicle 904 can send raw sensor data to the computing device(s) 920. In other examples, the vehicle 904 can send processed sensor data and/or representations of sensor data (for instance, the object perception tracks) to the computing device(s) 920. In some examples, the vehicle 904 can send sensor data to the computing device(s) 920 at a particular frequency, after a lapse of a predetermined period of time, in near real-time, etc. In some cases, the vehicle 904 can send sensor data (raw or processed) to the computing device(s) 920 as one or more log files.

The computing device(s) 920 may include processor(s) 922 and computer readable media 924 storing a training component 926, a machine learning component 928, as well as training data 930. The training component 926 may generate the training data 930 using the sensor data received from one or more vehicles 904. For instance, the training component 926 may label data representative of an object with one or more measured parameters or characteristics of the object in the sensor data. The training component 926 may then use the training data 930 to train the machine learning component 928 to predict motion states of predict current or future speed, trajectory, and/or any other characteristics of objects based on pose of the object depicted in the radar data.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) of the vehicle 904 and the processor(s) 922 of the computing device(s) 920 may be any suitable processor capable of executing instructions to process data and perform operations as described herein. By way of example and not limitation, the processor(s) 922 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

Computer readable media 924 and memory 908 are examples of non-transitory computer-readable media. The computer readable media 924 and memory 908 can store an operating system and one or more software applications, instructions, programs, and/or data to implement the methods described herein and the functions attributed to the various systems. In various implementations, the computer readable media can be implemented using any suitable computer readable media technology, such as static random-access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

Figure 10:
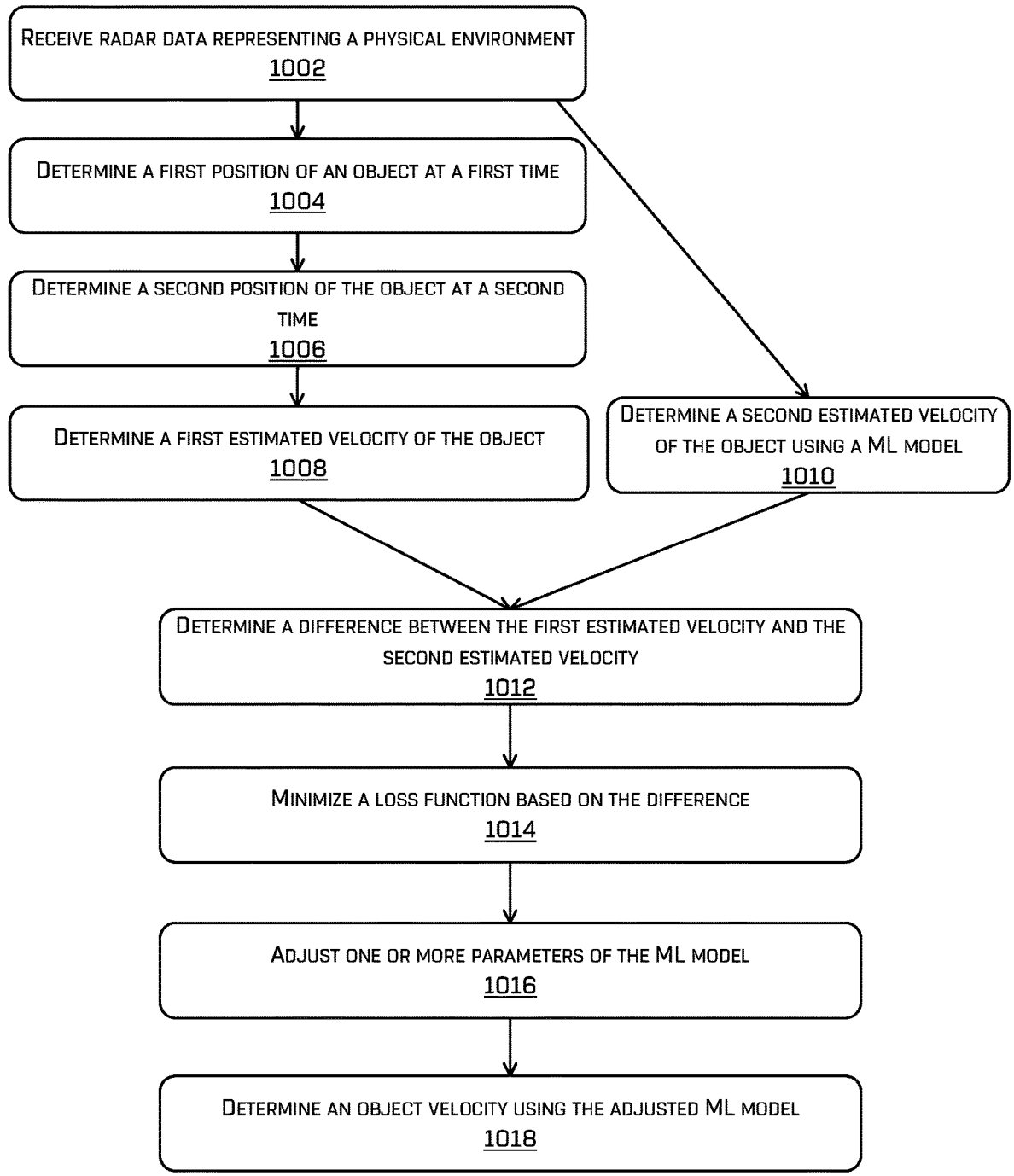
FIG. 10 is a flow diagram illustrating an example process for training and using a model to determine object velocity from radar data, as described herein.

FIG. 10 is a flow diagram illustrating an example process 1000 for training and using a model to determine object velocity from radar data, as described herein. The process 1000 is illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

At 1002, the process 1000 includes the radar-based perception system receiving radar data representing a physical environment over a period of time. The radar data may be captured by one or more sensors physically located at one or more position of an autonomous vehicle. The radar data may be captured over a time interval including a first time and a second time. In some cases, the time interval may be based on one or more characteristic of the one or more sensors.

At 1004, the process 1000 includes determining a first position of an object at a first time. The first position is determined within the radar data using a manual or automated determination at the first time. In a manual determination, a user may label the radar data with a position of the object at the first time. In an automated determination, one or more machine learning models and/or algorithms may be used to identify the object within the radar data and identify the location of the object within the radar data. The location of the object may be labeled as metadata associated with the radar data.

At 1006, the process 1000 includes determining a second position of the object at a second time. The second position is determined within the radar data using a manual or automated determination. In a manual determination, a user may label the radar data with a position of the object at the first time. In an automated determination, one or more machine learning models and/or algorithms may be used to identify the object within the radar data and identify the location of the object within the radar data. The location of the object may be labeled as metadata associated with the radar data.

At 1008, the process 1000 includes determining a first estimated velocity of the object. The first estimated velocity may be determined based on a change in the position of the object over the period of time between the first time and the second time. The time difference may be over a period of less than one second or over a period of one or more seconds. The radar data may be captured in successive intervals with the positions determined in successive frames of radar data. The determined change in position over the known period of time may be used to estimate the two-dimensional velocity of the object between the first time and the second time.

At 1010, the process 1000 includes determining a second estimated velocity of the object using a machine learning model. The second estimated velocity may be determined in parallel with the first estimated velocity. The second estimated velocity may be determined by inputting the first radar data at the first time into the machine learning model. In examples, the machine learning model may be configured to identifying objects, as illustrated in FIGS. 1-5 of the present description. The estimated velocity may then be determined based on the object representation determined as described herein.

At 1012, the process 1000 includes determining a difference between the first estimated velocity and the second estimated velocity. The difference may be determined based on a comparison of the magnitude and the direction of the velocity estimations for the first estimation and second estimation. The difference may be determined as a percent difference or as an absolute difference between the first and second estimated velocities.

At 1014, the process 1000 includes minimizing a loss function determined based on the difference between the first estimated velocity and the second estimated velocity. Minimizing the loss function may be used to train the machine learning model in a self-supervised manner. The loss function may use the difference between the estimated velocities to adjust one or more parameters of the machine learning model at 1016 to perform the self-supervised training.

At 1018, the process 1000 includes determining an object velocity using the adjusted machine learning model. After the machine learning model is trained using the self-supervision described above, the machine learning model may be used by an autonomous vehicle system to determine a two-dimensional velocity for an object and plan a path in the environment accordingly.

Figure 11:
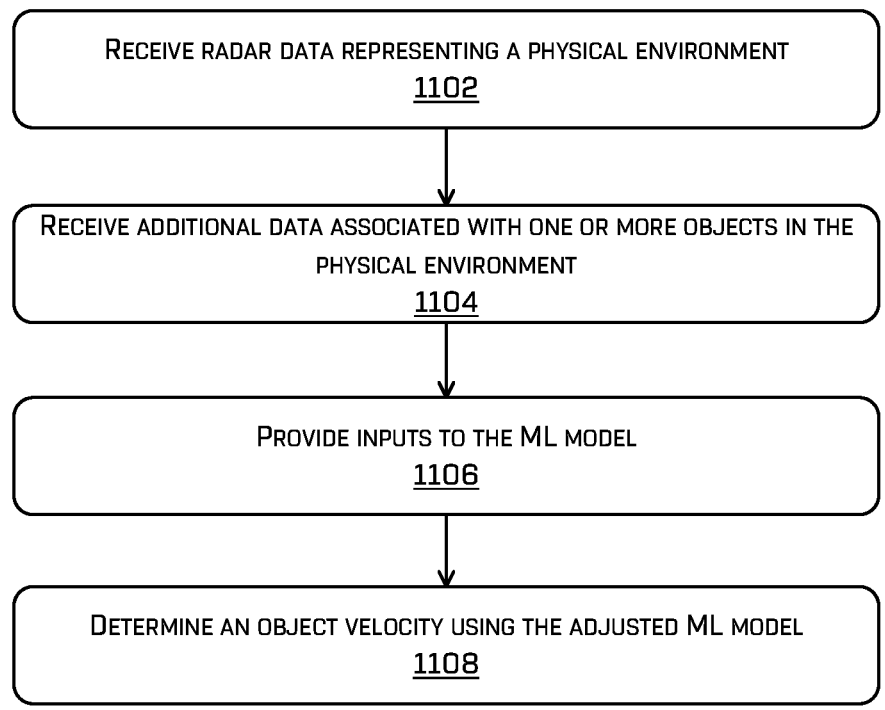
FIG. 11 is a flow diagram illustrating an example process 1100 for vehicle perception using inference from the model of FIG. 10, as described herein.

FIG. 11 is a flow diagram illustrating an example process 1100 for vehicle perception using inference from the model of FIG. 10, according to some examples. The process 1100 is illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

At 1102, the process 1100 includes the radar-based perception system receiving radar data representing a physical environment over a period of time. The radar data may be captured by one or more sensors physically located at one or more position of an autonomous vehicle. The radar data may be captured over a time interval including a first time and a second time. In some cases, the time interval may be based on one or more characteristic of the one or more sensors.

At 1104, the process 1100 includes receiving additional data associated with one or more objects in the physical environment. The additional data may include data from sensors other than radar-based sensors, such as and including lidar data, image data, range data, distance data, speedometer data, and other such data. The additional data may be received from systems of the autonomous vehicle and may also be received from sensors and/or systems external to the autonomous vehicle. For example, through vehicle-to-vehicle communication, data may be conveyed to the autonomous vehicle from other vehicles including additional radar and/or sensor data perceived by the other vehicles.

At 1106, the process 1100 includes determining an estimated velocity of the object using a machine learning model. The estimated velocity may be determined by inputting the radar data into the machine learning model trained as described with respect to FIG. 10 above. In examples, the machine learning model may be configured to identifying objects, as illustrated in FIGS. 1-5 of the present description. The estimated velocity may then be determined based on the object representation determined as described herein. In some examples, the inputs to the machine learned model may include doppler velocity or radar data velocity flow fields which may be encoded as a series of time-ordered radar data (e.g., a current set of radar data representing a most recent time and previous sets for respective previous times) for input into the model. The inputs may also include one or more of the additional data received at 1104, including data received from one or more other vehicles or systems in the environment. As disclosed herein, the model may be trained to output a flow field, a per-pixel (or per-point or per voxel) velocity estimate, a per-object velocity estimate or other and may be trained using time-ordered frames. The time-ordered training frames may include annotated frame-reference velocity information and/or the MLed model may learn search features using self-supervised techniques.

At 1108, the process 1000 includes determining an object velocity using the machine-learned model. After the machine-learned model is trained using the self-supervision described above, the machine learning model may be used by an autonomous vehicle system to determine a two-dimensional velocity for an object. The two-dimensional velocity may be output as a flow field as described herein, and the velocity for a particular object may be identified from the velocity flow field by identifying clusters of pixels or data having velocity magnitude and direction that are within a threshold of one another, thereby identifying rigid bodies moving as one within the environment. The clusters of points defining the objects may be identified using the techniques described herein and used in coordination with the output of the machine learning model to determine object velocity that may then be used by a perception and planning system of the autonomous vehicle to plan navigation through the environment and accurately represent the locations and movements of the objects in the environment that the autonomous vehicle must navigate in relation with.

EXAMPLE CLAUSES

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

A. A system comprising: one or more processors; and one or more non-transitory computer readable media storing instructions executable by the one or more processors, wherein the instructions, when executed, cause the system to perform operations comprising: receiving radar data associated with an object over a period of time, the radar data including a doppler velocity data: determining a first position of the object at a first time of the period of time based on the radar data: determining a second position of the object at a second time of the period of time based on the radar data: determining a flow field associated with the object based at least in part on the first position and second position of the object; determining a first estimated two-dimensional velocity of the object at the second time based at least in part on the flow field: determining a second estimated velocity of the object at the second time by providing the radar data including a doppler velocity of the object at the second time and the first time to a machine-learned model configured to output a two-dimensional velocity for the object: determining a loss function based on the first estimated velocity and the second estimated velocity; and adjusting one or more parameters of the model based on the loss function.

B. The system of example A, wherein the flow field comprises velocities for a plurality of discrete areas or points of the radar data.

C. The system of any of examples A-B, wherein the sensor data comprises data from at least one of: a range sensor of an autonomous vehicle: or sensor data from objects external to the system.

D. The system of any of examples A-C, wherein: determining the first position comprises receiving first metadata associated with the radar data at the first time, the first metadata indicating a first probability of the object being at a first location within the radar data at the first time; and determining the second position comprises receiving second metadata associated with the radar data at the second time, the second metadata indicating a second probability of the object being at a second location within the radar data at the second time.

E. The system of any of examples A-D, wherein: determining at least one of the first position of the object or the second position of the object comprises: determining a first set of points at a first location of the radar data define a rigid body of the object based on the first set of points being within a threshold distance of one another: or determining a second set of points at a second location of the radar data define the rigid body of the object based on identifying an outline of the object defined by the second set of points.

F. The system of any of examples A-E, wherein determining the first estimated velocity is based on the first location of the rigid body and the second location of the rigid body.

G. A method of training a model for determining two-dimensional object velocity based on radar input, comprising: receiving first radar data at a first time, the first radar data comprising first doppler velocity data: receiving second radar data at a second time, the second radar data comprising second doppler velocity data: determining a first position at the first time of an object in the first radar data: determining a second position at the second time of the object in the second radar data: inputting the first doppler velocity data or the second doppler velocity data into the model: receiving, as an output of the model, a two-dimensional velocity of the object: determining a ground truth velocity based on the position of the object at the first time and at the second time: determining a loss function based on a difference between the two-dimensional velocity and the ground truth velocity; and training the model by minimizing the loss function.

H. The method of example G, wherein the first radar data and the second radar data are gathered by a radar sensor of an autonomous vehicle in motion and using an autonomous vehicle reference frame.

I. The method of any of examples G-H, wherein the two-dimensional velocity and the ground truth velocity are determined on a global reference frame, the global reference frame static with respect to the autonomous vehicle reference frame.

J. The method of any of examples G-I, further comprising: receiving sensor data associated with the object at least at one of the first time or the second time; and determining an estimated velocity based on the sensor data, and wherein determining the loss function is further based on a difference between the estimated velocity and the two-dimensional velocity.

K. The method of any of examples G-J, wherein determining the two-dimensional velocity comprises applying a neural network to generate the two-dimensional velocity as a learned inference associated with the radar data, wherein the neural network is trained using time-ordered radar data including object positions over time.

L. The method of any of examples G-K, wherein determining the first position of the object and the second position of the object comprises: receiving first metadata associated with the first radar data, the first metadata including a first probability of the object being at a first location within the first radar data; and receiving second metadata associated with the second radar data, the second metadata including a second probability of the object being at a second location within the second radar data.

M. The method of any of examples G-L, further comprising determining a vehicle velocity for an autonomous vehicle equipped with a radar sensor configured to capture the first radar data and the second radar data, and wherein determining the two-dimensional velocity is further based on providing the vehicle velocity to the model with the radar data.

N. The method of any of examples G-M, further comprising controlling an autonomous vehicle based at least in part on using the model to determine one or more velocities for one or more objects in an environment surrounding the autonomous vehicle in response to radar data gathered by the autonomous vehicle.

O. A non-transitory computer-readable medium storing instructions that, when executed, cause one or more processors to perform operations comprising: receiving first radar data at a first time, the first radar data comprising first doppler velocity data: receiving second radar data at a second time, the second radar data comprising second doppler velocity data; determining a first position at the first time of an object in the first radar data: determining a second position at the second time of the object in the second radar data: inputting the first doppler velocity data or the second doppler velocity data into a machine learning model; receiving, as an output of the machine learning model, a two-dimensional velocity of the object; determining a ground truth velocity based on the position of the object at the first time and at the second time: determining a loss function based on a difference between the two-dimensional velocity and the ground truth velocity; and training the machine learning model by minimizing the loss function.

P. The non-transitory computer-readable medium of example O, wherein the operations further comprise: receiving sensor data associated with the object at least at one of the first time or the second time; and determining an estimated velocity based on the sensor data, and wherein determining the loss function is further based on a difference between the estimated velocity and the two-dimensional velocity.

Q. The non-transitory computer-readable medium of any of examples O-P, wherein determining the first position of the object and the second position of the object comprises: receiving first metadata associated with the first radar data, the first metadata including a first probability of the object being at a first location; and receiving second metadata associated with the second radar data, the second metadata including a second probability of the object being at a second location.

R. The non-transitory computer-readable medium of any of examples O-Q, further comprising determining a vehicle velocity for an autonomous vehicle capturing the radar data, and wherein determining the two-dimensional velocity is further based on providing the vehicle velocity as an input to the machine learning model.

S. The non-transitory computer-readable medium of any of examples O-R, wherein the first radar data and the second radar data is gathered by a radar sensor of an autonomous vehicle in motion and using an autonomous vehicle reference frame.

T. The non-transitory computer-readable medium of any of examples O-S, wherein the two-dimensional velocity and ground truth velocity are determined on a global reference frame, the global reference frame static with respect to motion of the autonomous vehicle and the autonomous vehicle reference frame.

CONCLUSION

As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 6 may utilize the processes and flows of FIGS. 1-5.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

As a non-limiting example, techniques described herein may be performed, at least in part, by a computing device of an autonomous vehicle, which may receive sensor data and detect one or more objects in an environment and/or determine attributes or object parameters of the one or more objects in the physical environment. Object parameters may comprise velocity, acceleration, position, classification, and/or extents of each of the one or more objects, in addition to any uncertainty information associated therewith. Sensor data captured by the autonomous vehicle may include light detection and ranging (lidar) sensor data, radio detection and ranging (radar) sensor data, sound navigation and ranging (sonar) sensor data, image data, time of flight data, and the like. In some cases, sensor data may be provided to a perception system configured to determine a type of object (e.g., vehicle, pedestrian, bicycle, animal, parked car, tree, building, and the like) in the environment. Further, the out of sequence perception system may determine, based on the sensor data, movement information about the object in the physical environment.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A system comprising:
   one or more processors; and
   one or more non-transitory computer readable media storing instructions executable by the one or more processors, wherein the instructions, when executed, cause the system to perform operations comprising:
   receiving radar data associated with an object over a period of time, the radar data including a doppler velocity data;
   determining a first position of the object at a first time of the period of time based on the radar data;
   determining a second position of the object at a second time of the period of time based on the radar data;
   determining a flow field associated with the object based at least in part on the first position and second position of the object;
   determining a first estimated two-dimensional velocity of the object at the second time based at least in part on the flow field;
   determining a second estimated velocity of the object at the second time by providing the radar data including a doppler velocity of the object at the second time and the first time to a machine-learned model configured to output a two-dimensional velocity for the object;
   determining a loss function based on the first estimated two-dimensional velocity and the second estimated velocity; and
   adjusting one or more parameters of the machine-learned model based on the loss function.

2. The system of claim 1, wherein the flow field comprises velocities for a plurality of discrete areas or points of the radar data.

3. The system of claim 2, wherein the radar data comprises data from at least one of:
   a range sensor of an autonomous vehicle; or
   sensor data from objects external to the system.

4. The system of claim 1, wherein:
   determining the first position comprises receiving first metadata associated with the radar data at the first time, the first metadata indicating a first probability of the object being at a first location within the radar data at the first time; and
   determining the second position comprises receiving second metadata associated with the radar data at the second time, the second metadata indicating a second probability of the object being at a second location within the radar data at the second time.

5. The system of claim 1, wherein:
   determining at least one of the first position of the object or the second position of the object comprises:
   determining a first set of points at a first location of the radar data define a rigid body of the object based on the first set of points being within a threshold distance of one another; or
   determining a second set of points at a second location of the radar data define the rigid body of the object based on identifying an outline of the object defined by the second set of points.

6. The system of claim 5, wherein determining the first estimated two-dimensional velocity is based on the first location of the rigid body and the second location of the rigid body.

7. A method of training a model for determining two-dimensional object velocity based on radar input, comprising:
   receiving first radar data at a first time, the first radar data comprising first doppler velocity data;
   receiving second radar data at a second time, the second radar data comprising second doppler velocity data;
   determining a first position at the first time of an object in the first radar data;
   determining a second position at the second time of the object in the second radar data;
   determining a flow field associated with the object based at least in part on the first position and the second position of the object;
   inputting the first doppler velocity data or the second doppler velocity data into the model;
   receiving, as an output of the model, a two-dimensional velocity of the object based at least in part on the flow field;
   determining a ground truth velocity based on the first position of the object at the first time and one the second position of the object at the second time;
   determining a loss function based on a difference between the two-dimensional velocity and the ground truth velocity; and
   training the model by minimizing the loss function.

8. The method of claim 7, wherein the first radar data and the second radar data are gathered by a radar sensor of an autonomous vehicle in motion and using an autonomous vehicle reference frame.

9. The method of claim 8, wherein the two-dimensional velocity and the ground truth velocity are determined on a global reference frame, the global reference frame static with respect to the autonomous vehicle reference frame.

10. The method of claim 7, further comprising:
receiving sensor data associated with the object at least at one of the first time or the second time; and
determining an estimated velocity based on the sensor data, and wherein determining the loss function is further based on a difference between the estimated velocity and the two-dimensional velocity.

11. The method of claim 7, wherein determining the two-dimensional velocity comprises applying a neural network to generate the two-dimensional velocity as a learned inference associated with the first radar data, wherein the neural network is trained using time-ordered radar data including object positions over time.

12. The method of claim 7, wherein determining the first position of the object and the second position of the object comprises:
receiving first metadata associated with the first radar data, the first metadata including a first probability of the object being at a first location within the first radar data; and
receiving second metadata associated with the second radar data, the second metadata including a second probability of the object being at a second location within the second radar data.

13. The method of claim 7, further comprising determining a vehicle velocity for an autonomous vehicle equipped with a radar sensor configured to capture the first radar data and the second radar data, and wherein determining the two-dimensional velocity is further based on providing the vehicle velocity to the model with the first radar data.

14. The method of claim 7, further comprising controlling an autonomous vehicle based at least in part on using the model to determine one or more velocities for one or more objects in an environment surrounding the autonomous vehicle in response to radar data gathered by the autonomous vehicle.

15. A non-transitory computer-readable medium storing instructions that, when executed, cause one or more processors to perform operations comprising:
receiving first radar data at a first time, the first radar data comprising first doppler velocity data;
receiving second radar data at a second time, the second radar data comprising second doppler velocity data;
determining a first position at the first time of an object in the first radar data;
determining a second position at the second time of the object in the second radar data;
determining a flow field associated with the object based at least in part on the first position and the second position of the object;
inputting the first doppler velocity data or the second doppler velocity data into a machine learning model;
receiving, as an output of the machine learning model, a two-dimensional velocity of the object based at least in part on the flow field;
determining a ground truth velocity based on the first position of the object at the first time and the second position of the object at the second time;
determining a loss function based on a difference between the two-dimensional velocity and the ground truth velocity; and
training the machine learning model by minimizing the loss function.

16. The non-transitory computer-readable medium of claim 15, wherein the operations further comprise:
receiving sensor data associated with the object at least at one of the first time or the second time; and
determining an estimated velocity based on the sensor data, and wherein determining the loss function is further based on a difference between the estimated velocity and the two-dimensional velocity.

17. The non-transitory computer-readable medium of claim 15, wherein determining the first position of the object and the second position of the object comprises:
receiving first metadata associated with the first radar data, the first metadata including a first probability of the object being at a first location; and
receiving second metadata associated with the second radar data, the second metadata including a second probability of the object being at a second location.

18. The non-transitory computer-readable medium of claim 15, further comprising determining a vehicle velocity for an autonomous vehicle capturing the first radar data, and wherein determining the two-dimensional velocity is further based on providing the vehicle velocity as an input to the machine learning model.

19. The non-transitory computer-readable medium of claim 15, wherein the first radar data and the second radar data is gathered by a radar sensor of an autonomous vehicle in motion and using an autonomous vehicle reference frame.

20. The non-transitory computer-readable medium of claim 19, wherein the two-dimensional velocity and ground truth velocity are determined on a global reference frame, the global reference frame static with respect to motion of the autonomous vehicle and the autonomous vehicle reference frame.

* * * * *